(12) United States Patent
Zhu et al.

(10) Patent No.: US 10,965,126 B2
(45) Date of Patent: Mar. 30, 2021

(54) SYSTEMS AND METHODS FOR CONTROL OF PHOTOVOLTAIC ARRAYS

(71) Applicant: Futurewei Technologies, Inc., Plano, TX (US)

(72) Inventors: Huibin Zhu, Plano, TX (US); Heping Dai, Plano, TX (US); Xiaolin Mao, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 30 days.

(21) Appl. No.: 15/583,456

(22) Filed: May 1, 2017

(65) Prior Publication Data

US 2018/0316191 A1 Nov. 1, 2018

(51) Int. Cl.
*H02J 3/00* (2006.01)
*H02J 3/38* (2006.01)
*G05F 1/66* (2006.01)
*H02M 3/02* (2006.01)

(52) U.S. Cl.
CPC ............... *H02J 3/383* (2013.01); *G05F 1/66* (2013.01); *H02J 3/00* (2013.01); *H02J 3/381* (2013.01); *H02M 3/02* (2013.01)

(58) Field of Classification Search
CPC ............... H02M 3/02; H02J 3/00; G05F 1/66
USPC .......................................................... 307/63
See application file for complete search history.

(56) References Cited

U.S. PATENT DOCUMENTS

| | | | |
|---|---|---|---|
| 7,602,808 B2 | 10/2009 | Hadar | |
| 8,004,116 B2 | 8/2011 | Ledenev | |
| 8,013,472 B2 | 9/2011 | Adest | |
| 8,102,074 B2 | 1/2012 | Hadar | |
| 8,274,172 B2 | 9/2012 | Hadar | |
| 8,531,055 B2 | 9/2013 | Adest | |
| 8,816,535 B2* | 8/2014 | Adest | H02J 1/102 307/86 |
| 9,088,178 B2 | 7/2015 | Adest | |
| 9,366,714 B2 | 6/2016 | Ledenev | |
| 9,413,268 B2 | 8/2016 | Fu | |
| 9,431,825 B2 | 8/2016 | Arditi | |
| 9,442,504 B2 | 9/2016 | Porter | |
| 9,577,425 B1* | 2/2017 | Abu Qahouq | H02J 1/102 |
| 9,866,098 B2* | 1/2018 | Yoscovich | H02M 1/00 |
| 2008/0097655 A1* | 4/2008 | Hadar | H02J 13/00028 700/286 |
| 2011/0056533 A1* | 3/2011 | Kuan | H01L 31/02021 136/244 |

(Continued)

OTHER PUBLICATIONS

Adhikari, et al., P-Q and P-V Control of Photovoltaic Generators in Distribution Systems, IEEE Transactions on Smart Grid, Nov. 2015, pp. 2929-2941, vol. 6, No. 6.

(Continued)

*Primary Examiner* — Adi Amrany

(74) *Attorney, Agent, or Firm* — Vierra Magen Marcus LLP

(57) ABSTRACT

An apparatus includes a plurality of photovoltaic modules including at least a first and a second photovoltaic module having outputs connected in series by a bus. A voltage detection circuit detects a bus voltage at an output of the bus, to provide an indicator of detected bus voltage to the first photovoltaic module, and to provide the indicator of detected bus voltage to the second photovoltaic module.

22 Claims, 14 Drawing Sheets

(56) References Cited

U.S. PATENT DOCUMENTS

| | | | | |
|---|---|---|---|---|
| 2012/0206118 A1* | 8/2012 | Williams | ................ | H02J 3/385 323/282 |
| 2013/0026839 A1* | 1/2013 | Grana | .................... | H02J 3/381 307/71 |
| 2013/0194706 A1* | 8/2013 | Har-Shai | .............. | H02H 1/0015 361/42 |
| 2013/0328397 A1* | 12/2013 | Lee | ........................... | H02J 3/32 307/23 |
| 2014/0152276 A1* | 6/2014 | Kobayashi | ............ | H02M 3/158 323/271 |
| 2015/0137606 A1* | 5/2015 | Adest | ........................ | H02J 1/00 307/77 |
| 2015/0171789 A1* | 6/2015 | Har-Shai | .............. | H02H 1/0015 307/66 |
| 2015/0188415 A1* | 7/2015 | Abido | .................... | H02M 3/005 307/103 |
| 2015/0303803 A1* | 10/2015 | Chen | ...................... | H02M 3/158 323/271 |
| 2015/0372490 A1* | 12/2015 | Bakas | ..................... | H02J 3/385 307/52 |
| 2016/0126847 A1* | 5/2016 | Pahlevaninezhad | .... | H02S 40/32 363/21.02 |
| 2017/0096327 A1* | 4/2017 | Schuster | ................ | F04B 23/00 |

OTHER PUBLICATIONS

Ding et al., Adaptive DC-Link Voltage Control of Two-Stage Photovoltaic Inverter During Low Voltage Ride-Through Operation, IEEE Transactions on Power Electronics, Jun. 2016, pp. 4182-4194, vol. 31, No. 6.

Jain et al., A Three-Phase Grid Tied SPV System with Adaptive DC Link Voltage for CPI Voltage Variations, IEEE Transactions of Sustainable Energy, Jan. 2016, pp. 337-344, vol. 7, No. 1.

Liu et al., Droop Control with Improved Disturbance Adaption for a PV System with Two Power Conversion Stages, IEEE Transactions on Industrial Electronics, Oct. 2016, pp. 6073-6085, vol. 63, No. 10.

* cited by examiner

SYSTEMS AND METHODS FOR CONTROL OF PHOTOVOLTAIC ARRAYS

BACKGROUND

Solar panels generate Direct Current (DC) voltages. Typically, the DC voltage and DC current from one solar panel is well below the needs of the voltage and current needed for the Alternating Current (AC) power grid. Typically, many solar panels are used in combination to provide the necessary voltage and current for the AC power grid. The DC voltages/currents also need to be converted to AC voltages/currents. A significant challenge is to efficiently transfer the DC power from each solar panel to the AC power grid. Note that this problem is not limited to converting from DC power to AC power. Even if the solar panels (or other DC power sources) were to be combined to provide DC power, there are challenges in efficiently "combining" the DC power. A significant factor in this challenge is that the power/voltage/current output of a solar panel is not fixed.

SUMMARY

According to one aspect of the present disclosure, there is provided an apparatus that includes: a plurality of photovoltaic modules including at least a first photovoltaic module having a first output and a second photovoltaic module having a second output; a bus connecting the plurality of photovoltaic modules, the bus connecting the first output and the second output in series; and a voltage detection circuit to detect a bus voltage at an output of the bus, to provide an indicator of detected bus voltage to the first photovoltaic module, and to provide the indicator of detected bus voltage to the second photovoltaic module.

Optionally, in any of the preceding aspects, another implementation of the aspect provides that the first photovoltaic module comprises a first controller to apply a first control routine to control the first output in response to the indicator of detected bus voltage and the second photovoltaic module comprises a second controller to apply a second control routine to control the second output in response to the indicator of detected bus voltage.

Optionally, in any of the preceding aspects, another implementation of the aspect provides that the first control routine and the second control routine independently respond to the indicator of detected bus voltage and combined responses of the plurality of photovoltaic modules drive the bus voltage at the output of the bus to maintain the bus voltage at the output of the bus within a bus voltage range.

Optionally, in any of the preceding aspects, another implementation of the aspect provides an inverter connected to the output of the bus and the bus voltage range is in an acceptable input range of the inverter.

Optionally, in any of the preceding aspects, another implementation of the aspect provides that the voltage detection circuit comprises an analog-to-digital converter and the indicator of detected bus voltage is a digital indicator that includes a plurality of bits.

Optionally, in any of the preceding aspects, another implementation of the aspect provides a direct communication channel from the analog-to-digital converter to each photovoltaic module of the plurality of photovoltaic modules.

Optionally, in any of the preceding aspects, another implementation of the aspect provides that the analog-to-digital converter is located within a housing that houses a controller of the first photovoltaic module.

Optionally, in any of the preceding aspects, another implementation of the aspect provides that the voltage detection circuit comprises an analog measurement device to provide an analog indicator of detected bus voltage to the first photovoltaic module and to provide the analog indicator of detected bus voltage to the second photovoltaic module.

Optionally, in any of the preceding aspects, another implementation of the aspect provides that the first photovoltaic module includes a first analog-to-digital converter to convert the analog indicator of detected bus voltage for a first controller in the first photovoltaic module and the second photovoltaic module includes a second analog-to-digital converter to convert the analog indicator of detected bus voltage for a second controller in the second photovoltaic module.

According to one aspect of the present disclosure, there is provided an apparatus that includes: a plurality of power modules, each power module of the plurality of power modules having a plurality of power cells and a controller to control an output voltage; a bus connecting the plurality of power modules, the bus connecting outputs of the plurality of power modules in series; an inverter receiving a direct current (DC) input from the bus and generating an alternating current (AC) output; a voltage detection circuit to detect the DC input from the bus and to generate an indicator of detected voltage; and a plurality of feedback lines extending from the voltage detection circuit to controllers of the plurality of power modules to provide the indicator of detected voltage to the controllers of the plurality of power modules for individual feedback control by the controllers of the plurality of power modules.

Optionally, in any of the preceding aspects, another implementation of the aspect provides that each controller is configured to control an output voltage of a corresponding module, independently of other controllers of other modules, in response to the indicator of detected voltage.

Optionally, in any of the preceding aspects, another implementation of the aspect provides that each controller is configured to control the output voltage of the corresponding module using Proportional Integral (PI) control in response to the indicator of detected voltage.

Optionally, in any of the preceding aspects, another implementation of the aspect provides that a power module of the plurality of power modules further includes a DC-to-DC converter that has either a boost-buck circuit or a buck-boost circuit, and an output of the power module is generated by the DC-to-DC converter controlled by a corresponding controller in response to the indicator of detected voltage.

Optionally, in any of the preceding aspects, another implementation of the aspect provides that the output of the power module is controlled by modifying a duty cycle of the DC-to-DC converter.

Optionally, in any of the preceding aspects, another implementation of the aspect provides that the plurality of power modules are photovoltaic power modules, each power module of the plurality of power modules having a plurality of photovoltaic cells.

Optionally, in any of the preceding aspects, another implementation of the aspect provides that the plurality of power modules are electrochemical power storage modules, each power module of the plurality of power modules having a plurality of electrochemical cells.

According to one aspect of the present disclosure, there is provided a method that includes: detecting a combined output voltage of the plurality of power modules, the combined output voltage corresponding to a sum of individual output voltages of the plurality of power modules; generating an indicator that represents the combined output voltage; sending the indicator to each power module of the plurality of power modules; receiving the indicator in each power module of the plurality of power modules; and separately controlling in each power module of the plurality of power modules a respective individual power module output voltage in response to the indicator.

Optionally, in any of the preceding aspects, another implementation of the aspect provides that generating the indicator includes performing analog-to-digital conversion to provide the indicator as a digital value.

Optionally, in any of the preceding aspects, another implementation of the aspect provides that generating the indicator includes generating an analog signal that represents the combined output voltage, and sending the indicator to each power module of the plurality of power modules includes sending the analog signal to each of the plurality of power modules in parallel.

Optionally, in any of the preceding aspects, another implementation of the aspect provides separately controlling in each power module of the plurality of power modules a respective individual power module output voltage includes applying a Proportional Integral (PI) control routine in each power module of the plurality of power modules in response to the indicator.

Optionally, in any of the preceding aspects, the method further includes, in response to detecting a drop in the combined output voltage represented by the indicator, separately increasing, in each power module of the plurality of power modules, a respective individual power module output voltage in response to the indicator.

Optionally, in any of the preceding aspects, another implementation of the aspect provides separately controlling in each power module of the plurality of power modules a respective individual power module output voltage includes controlling a duty cycle of a boost-buck or buck-boost circuit in response to the indicator.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

Figure 1:
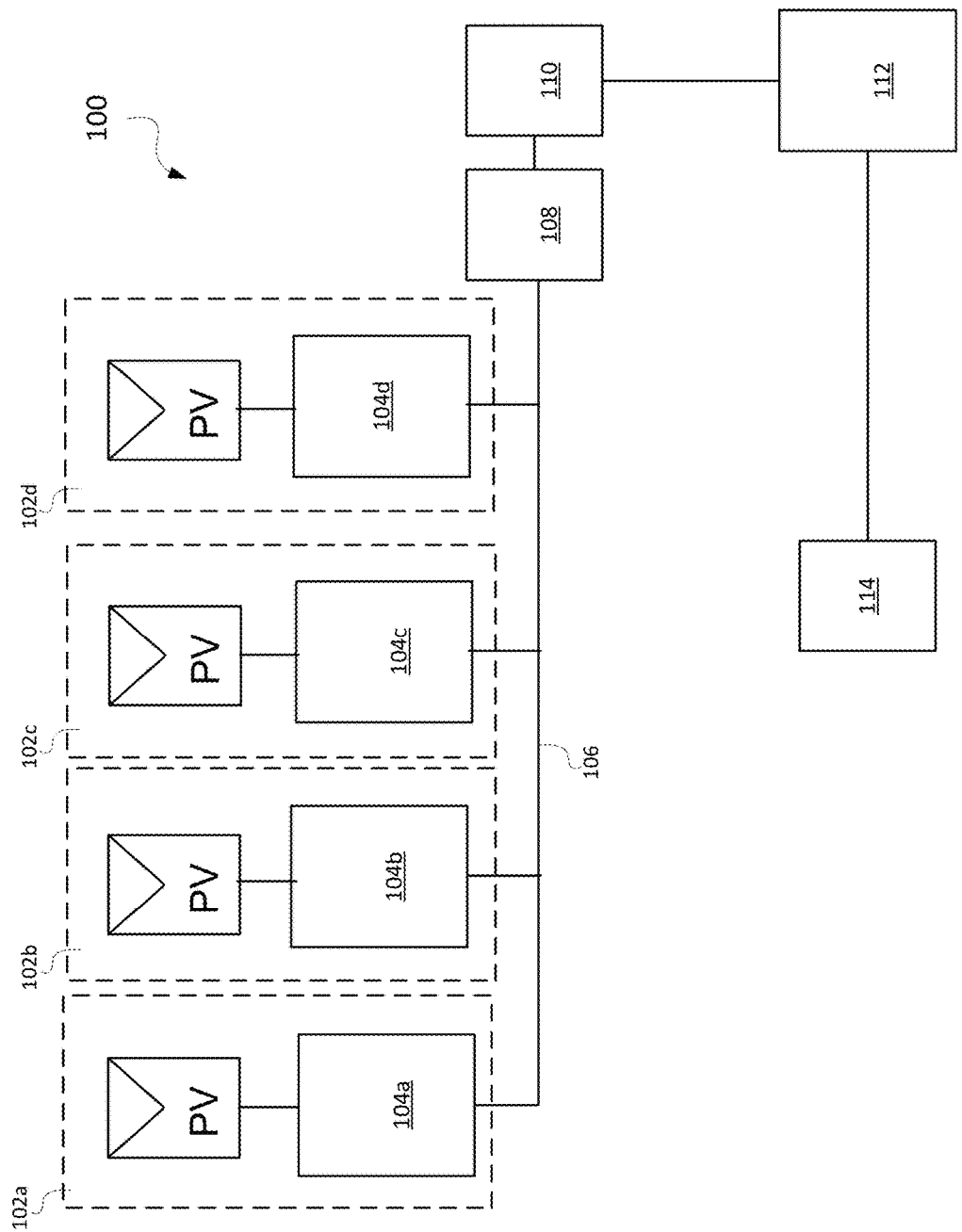
FIG. 1 shows a photovoltaic system including multiple photovoltaic modules.

The disclosure relates to technology for providing power, voltage, and/or current from a combination of DC sources. The DC sources may be power sources. In one embodiment, the DC sources are photovoltaic (e.g., solar) modules. In one embodiment, the DC sources are DC batteries.

In one embodiment, a system includes multiple power modules that individually generate DC electrical outputs, which are connected in series by a bus (also referred to as a "string bus"). In this arrangement, the output voltage of the bus is the sum of individual output voltages of the power modules connected by the bus. Such busses may be used in photovoltaic systems to combine outputs of multiple photovoltaic modules to achieve a desired output voltage that is provided to an inverter. The inverter then converts this DC input from the bus into an AC output. The voltage provided to an inverter may be maintained within an acceptable range to provide an adequate level of inverter efficiency. For example, a bus may provide electrical power to an inverter in a range of 200-500 volts in some situations. Inverter input voltage may be maintained at some higher voltage than the output voltage for efficient inverter operation so that, to produce a 230 volt AC output from an inverter (i.e. 230 volts root mean square voltage, or 325 volts peak-to-peak), it may be efficient to maintain DC input in a range of about 390 volts (e.g. 380-400 volts, or 350-440 volts). Furthermore, voltages in photovoltaic systems, may be limited by regulation for safety reasons. For example, regulations in the United States limit the voltage on any part of the power line connecting solar modules into a solar array to a maximum 600V. European regulations limit such voltages to a maximum of 1000V. Photovoltaic modules may generate a current and voltage that depend primarily on the intensity and wavelengths of sunlight which is not constant (e.g., time of day, time of year, temperature, cloud cover, and other factors may affect photovoltaic module output). As a result, photovoltaic modules may generate a varying amount of power and may provide outputs that vary in DC voltage and/or current. Maintaining efficiency when combining outputs from such variable power sources is challenging. For example, maintaining an output voltage from a bus to an inverter within a certain range (e.g. within safety limits and/or efficient operating range of inverter) may be challenging when the output voltage from the bus is the sum of individual photovoltaic module outputs that fluctuate in sometimes unpredictable ways. For power modules other than photovoltaic modules, other factors may cause fluctuation and may make control challenging.

One approach to combining multiple power modules is to provide a central controller that controls the outputs of the power modules in order to keep the bus output within a specified range. However, this approach generally involves a dedicated controller (in addition to any controller than may be present in individual power modules) and may result in a slow response to changes in bus output voltage because of latency in the controller.

In an example presented here, an output voltage of a bus that connects power modules in series is detected and an indication of the detected voltage is provided directly to the individual power modules that are connected to the bus. Each power module output is then controlled independently by a controller in the respective power module. This provides a distributed control arrangement as opposed to a central control arrangement. Advantageously, no central controller may be required in such an arrangement (although a central controller may be provided for other purposes) so that cost and complexity may be reduced. Where controllers are provided in power modules (e.g. controllers for control of individual module outputs) these controllers may be adequate for performing all module control without a central controller. In other cases, one or more central controllers or other central hardware may be provided for some functions while other functions are managed at a module level. Advantageously, providing an indicator of bus output voltage directly to power modules and controlling outputs independently in the individual modules may provide a more rapid response to changes in bus output voltage than are generally achieved when a central controller is inserted between the bus output and the power modules.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

FIG. 1 is an example of a photovoltaic system 100 that includes a plurality of power modules, which are photovoltaic modules 102a-d in this example. Each photovoltaic module 102a-d includes a photovoltaic panel (PV) and a respective module output circuit 104a-d to control the output of the photovoltaic module in which it is located. Module output circuits 104a-d receive inputs from photovoltaic panels in their respective modules and provide outputs to a bus 106. (A photovoltaic panel may also be referred to herein as a solar panel.) Each module output circuit 104a-d converts DC voltage/current from one or more solar panels to a DC output voltage that is provided to bus 106. Module output circuits 104a-d include DC-to-DC conversion circuits that may include boost-buck circuits, buck-boost circuits, other switched-mode power circuits, or other types of DC-to-DC power control circuits, including linear power circuits. Bus 106 provides an input to inverter 108, which generates an AC output. The AC output is then passed through a meter 110 to a power grid (e.g. commercial utility power grid) 112 for distribution to electrical consumers that provide a load 114 for the electrical grid. In other examples, an inverter output may be used without going through a commercial grid (e.g. photovoltaic modules may provide power that is exclusively consumed at a single location, for example, the house or other building where the photovoltaic modules are located). Where the AC output is not supplied to a grid, a meter may be unnecessary and an inverter may directly supply AC power to a load. For example, in a domestic photovoltaic system, an inverter may provide an AC output that supplies power to the home. Examples below may be applicable to various power module configurations and are not limited to photovoltaic modules connected to a grid or any other specific configuration.

Figure 2:
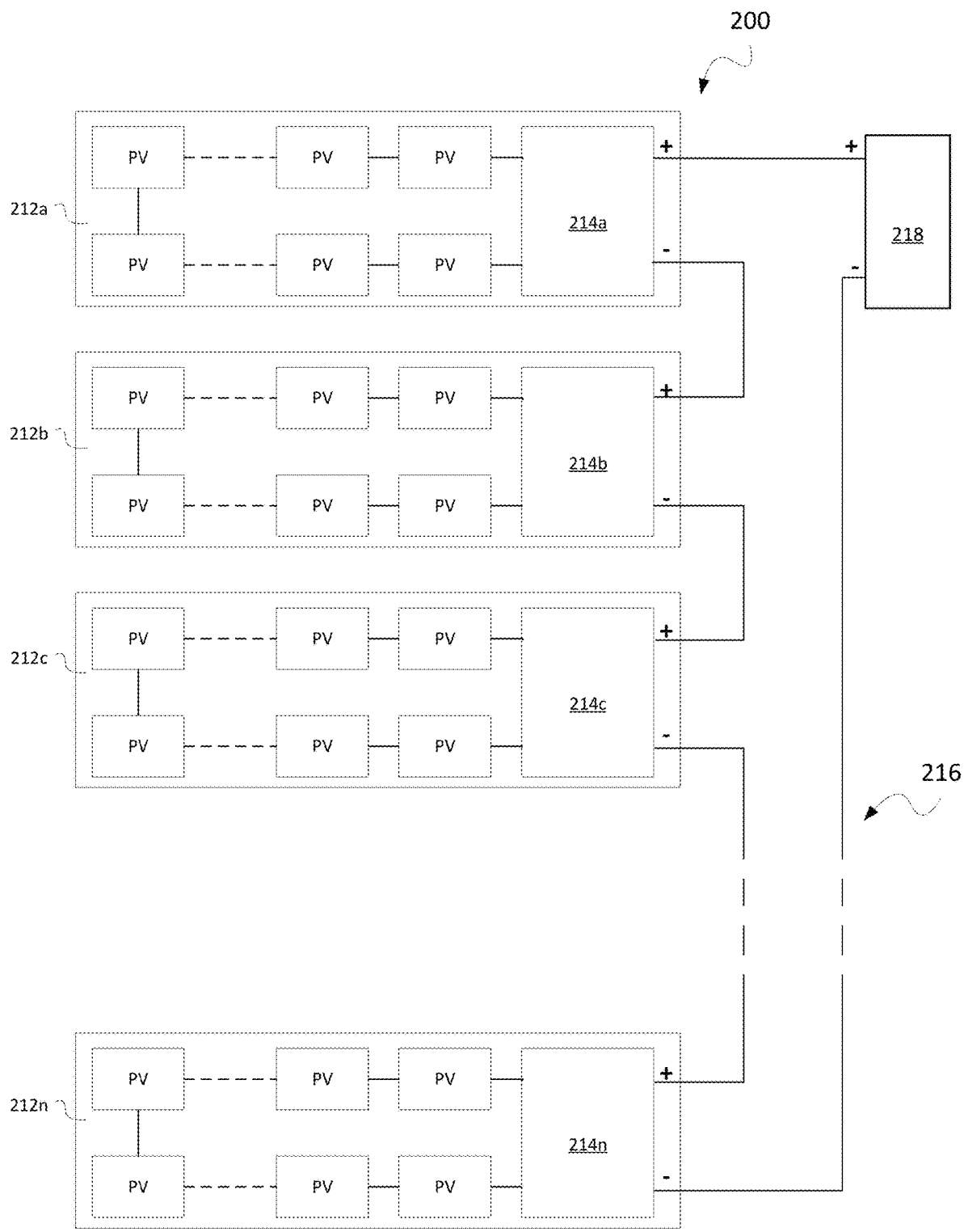
FIG. 2 is a schematic diagram of multiple photovoltaic modules connected to an inverter by a bus.

FIG. 2 is a schematic illustration of a system 210 that includes photovoltaic modules 212a-n each having a respective module output circuit 214a-n. It will be understood that the number of modules, n, may be any suitable number depending on a desired bus voltage and/or other factors. In a given photovoltaic module, photovoltaic cells ("PV Cell") are connected in series to provide an input to a module output circuit. For example, in photovoltaic module 212a, module output circuit 214a receives an input from series connected photovoltaic cells and generates a DC output that is provided to bus 216. In other systems, other types of power cells may be connected in series to form other power modules. For example, electrochemical cells may be similarly connected in series in an electrochemical power module or power storage module. Examples of power cells include photovoltaic cells and electrochemical cells. Photovoltaic cells convert photons into electricity. Photovoltaic cells may convert photons of various wavelengths including in the visible spectrum and near-visible spectrum (e.g. infra-red radiation). Bus 216 is formed of conductors, for example, conductive metal wires that connect output terminals of photovoltaic modules. Bus 216 connects photovoltaic modules 212a-n in series so that the voltages are added together to produce a combined voltage that is the sum of their individual voltage outputs. In FIG. 2, each photovoltaic module has a lower terminal that is negative ("−") and an upper terminal that is positive ("+") with the positive terminal of a lower photovoltaic module connected to the negative terminal of a neighboring photovoltaic module above it. For example, the positive terminal of photovoltaic module 212c is connected to the negative terminal of photovoltaic module 212b and the positive terminal of photovoltaic module 212b is connected to the negative terminal of photovoltaic module 212a. The positive terminal of photovoltaic module 212a is connected to a positive input terminal of inverter 218, while a negative terminal of photovoltaic module 212n is connected to a negative input terminal of inverter 218. Thus, inverter 218 receives an input that is the sum of all photovoltaic module outputs connected to bus 216 (minus any resistive loss). For example, if each photovoltaic module 212a-n provides an output voltage of 10 volts, then the combined output voltage supplied to inverter 218 by bus 216 would be 10×n.

In operation, the contributions of different photovoltaic modules 212a-n may vary for several reasons so that voltage, current, and power provided by individual photovoltaic modules 212a-n to bus 216 may vary and may cause the bus output voltage to inverter 218 to vary. For example, external conditions may cause changes in photovoltaic module outputs. Changing weather (including clouds) may affect different photovoltaic modules differently especially where photovoltaic modules are widely dispersed. Shadows may pass across various photovoltaic modules at various times causing individual photovoltaic modules to provide different outputs at different times. Photovoltaic modules may have different orientations causing them to have different efficiencies at different times of day. Internal factors may also affect photovoltaic modules in nonuniform ways. Photovoltaic modules may also provide different contributions because of factors that are internal to the individual photovoltaic modules. For example, photovoltaic modules may wear out at different rates so that some photovoltaic modules may be become less efficient than others over time and may be more limited in the voltage, current, and/or power that they contribute. New replacement photovoltaic modules may be more efficient than older photovoltaic modules. Internal faults may cause photovoltaic modules to provide reduced output either temporarily or permanently. Other factors may also cause variation in photovoltaic module output voltage, current, and/or power.

Figure 3B:
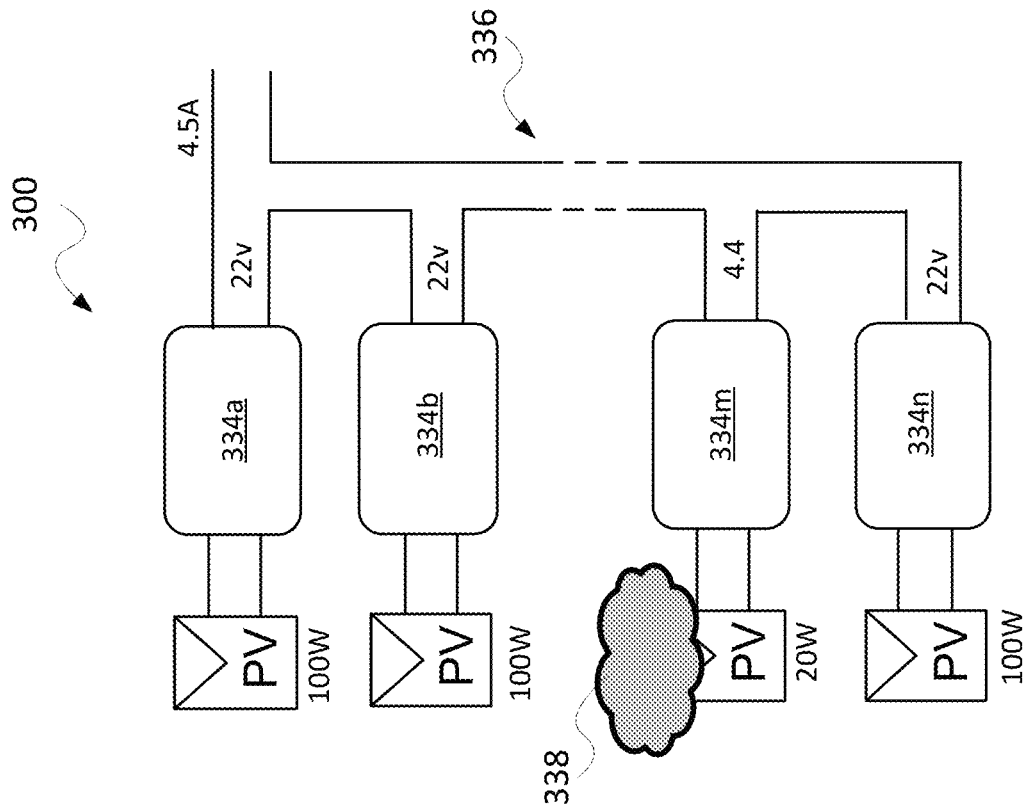
FIGS. 3A-B illustrate operation of a photovoltaic system with multiple photovoltaic modules during different conditions.
Figure 3A:
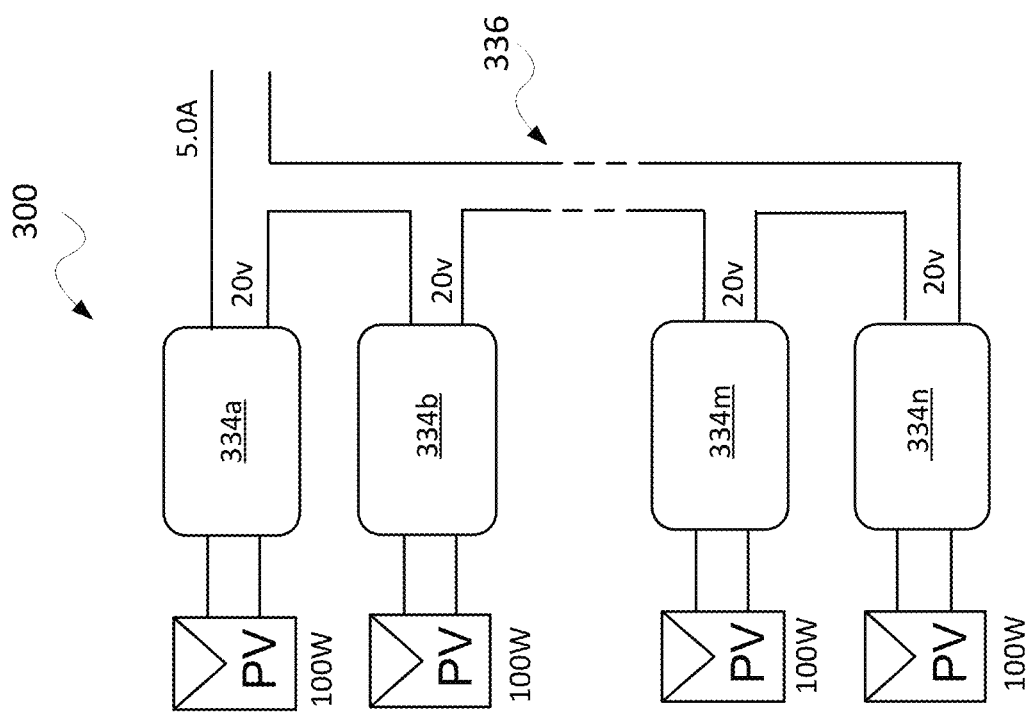

FIGS. 3A-B illustrate how changing conditions may affect a photovoltaic system 300 in which outputs of multiple photovoltaic module output circuits 334a-n are connected in series by a bus 336. FIG. 3A shows a scenario where all outputs are equal, with each photovoltaic panel "PV" producing a hundred watts (100 W) of power and each module output circuits 334a-n providing this 100 W power at an output voltage of twenty volts (20 v) and a current of five amps (5.0 A) on bus 336.

FIG. 3B shows a scenario in which the power output of one photovoltaic panel is reduced to twenty watts (20 W). In this example, a cloud 338 is shown shadowing the photovoltaic panel, however it will be understood than several different factors may cause one or more photovoltaic panels to produce lower than usual power. Module output circuit 334m provides a reduced output voltage of four point four volts (4.4 v) and a current of four point five amps (4.5 A) as a result of the reduced power. Module output circuits 334a-n produce increased voltages of twenty-two volts (22 v) in this example (numbers are rounded off). In some cases, the photovoltaic module output voltages shown in FIG. 3B may maintain a bus output voltage to an inverter (not shown in FIG. 3B) within a specified range. In other cases, additional adjustment may be required to keep bus output voltage within a specified range. For example, if only four modules are connected to a bus in this scenario then the output voltage is (3×22)+4.4=70.4 v compared with 4×20=80 v in FIG. 3A. Additional adjustment to output voltages of module output circuits 334a-n may be desirable to bring an output voltage of bus 336 back to an acceptable range (e.g. back within a range of 75-85 v). If there are more modules, then this adjustment may be sufficient, i.e. if each unaffected module increases its output voltage by up to two volts (2 v) then in a system with eight or more unaffected modules, a drop of sixteen volts in an affected module may be made up by the unaffected modules.

Figure 4:
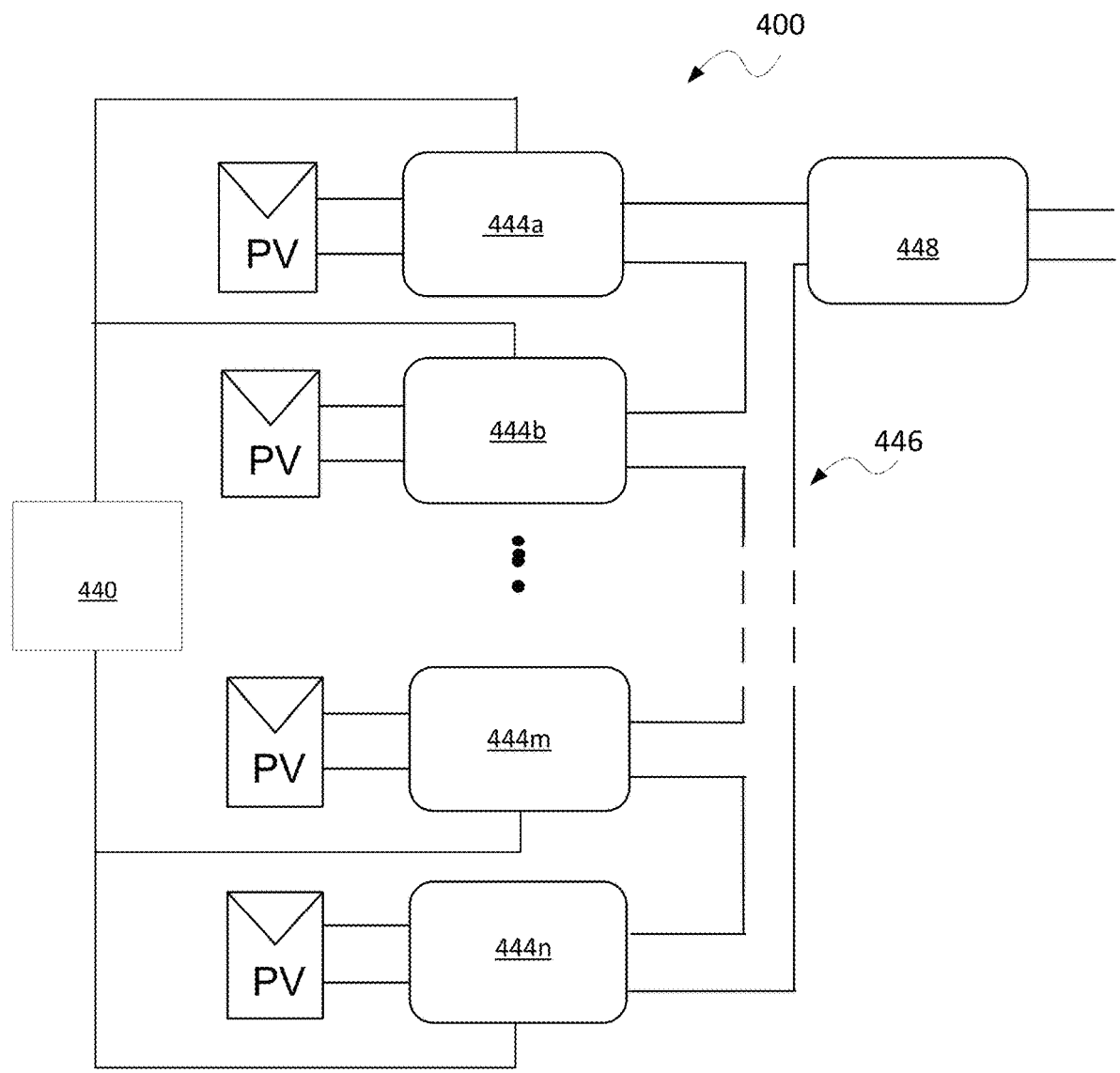
FIG. 4 illustrates a central controller that controls outputs of photovoltaic modules.

FIG. 4 illustrates an example of a photovoltaic system 400 in which a controller 440 controls module output circuits 444a-n in order to coordinate outputs provided to bus 446 so that a bus output provided to inverter 448 may be maintained within a specified range. Controller 440 is connected to module output circuits 444a-n to control respective outputs of module output circuits 444a-n. Controller 440 may control these inputs based on a variety of factors including voltage, current, or other measured values at one or more points in photovoltaic system 400. Controller may provide inputs to particular module output circuits to cause them to change their outputs in specified ways. For example, controller 440 may command a module output circuit to increase output voltage or current. In some examples, a module output circuit may include a switched-mode power circuit and controller 440 may command a module output circuit to operate such a switched-mode power circuit at a particular duty cycle, which may provide a specific output.

Figure 5:
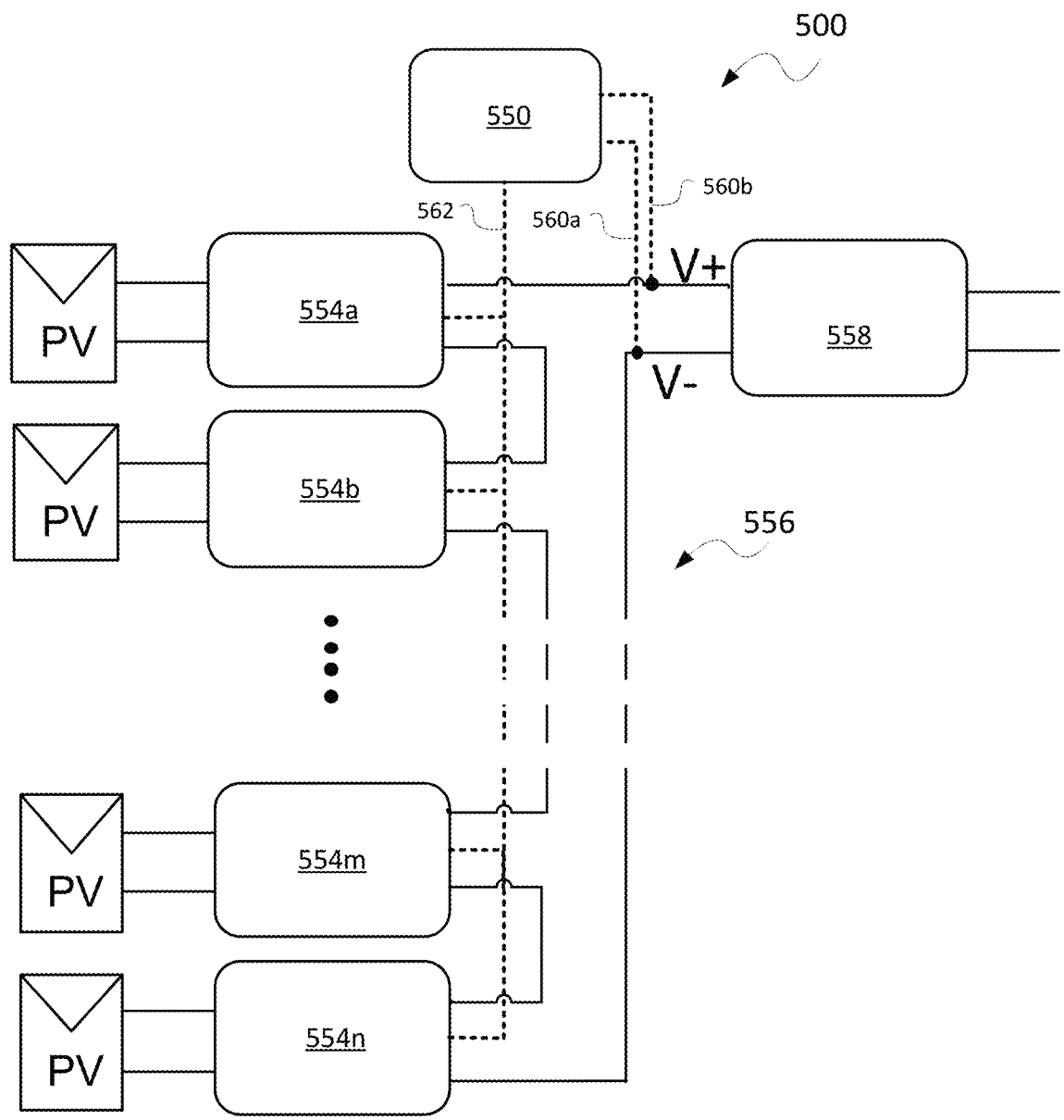
FIG. 5 illustrates an example of a photovoltaic system that provides an indicator of detected bus output voltage to each photovoltaic module.

FIG. 5 illustrates an alternative example of a photovoltaic system 500 that does not have a controller like controller 440 of FIG. 4. Photovoltaic system 500 includes a voltage detection circuit 550 which is connected to an output of bus 556 where it is provided as an input to inverter 558. Specifically, electrical leads 560a-b connect voltage detection circuit 550 to negative and positive output terminals respectively of bus 556. Voltage detection circuit 550 detects a voltage at the output of bus 556 and provides an indicator of the detected bus voltage to module output circuits 554a-n via a communication channel 562. (Electrical leads 560a-b and communication channel 562 are shown by dotted lines to distinguish them from conductors of bus 556.) The indicator of detected bus voltage may be a digital value, an analog signal, or any suitable indicator. Module output circuits 554a-m may control their outputs in response to the indicator of detected bus voltage. Each module output circuit 554a-n may separately control its output in response to the indicator of detected bus voltage received over communication channel 562. Thus, rather than having a central controller to control multiple outputs provided to bus 556, in this example, each output provided to bus 556 is independently controlled by a controller in a corresponding module output circuit. Advantageously, this generally requires less hardware than shown in FIG. 5 and may result in a faster response time to changes in bus output voltage, which can be useful generally, and particularly when a transient event occurs that causes bus output voltage to exceed a limit.

Figure 6:
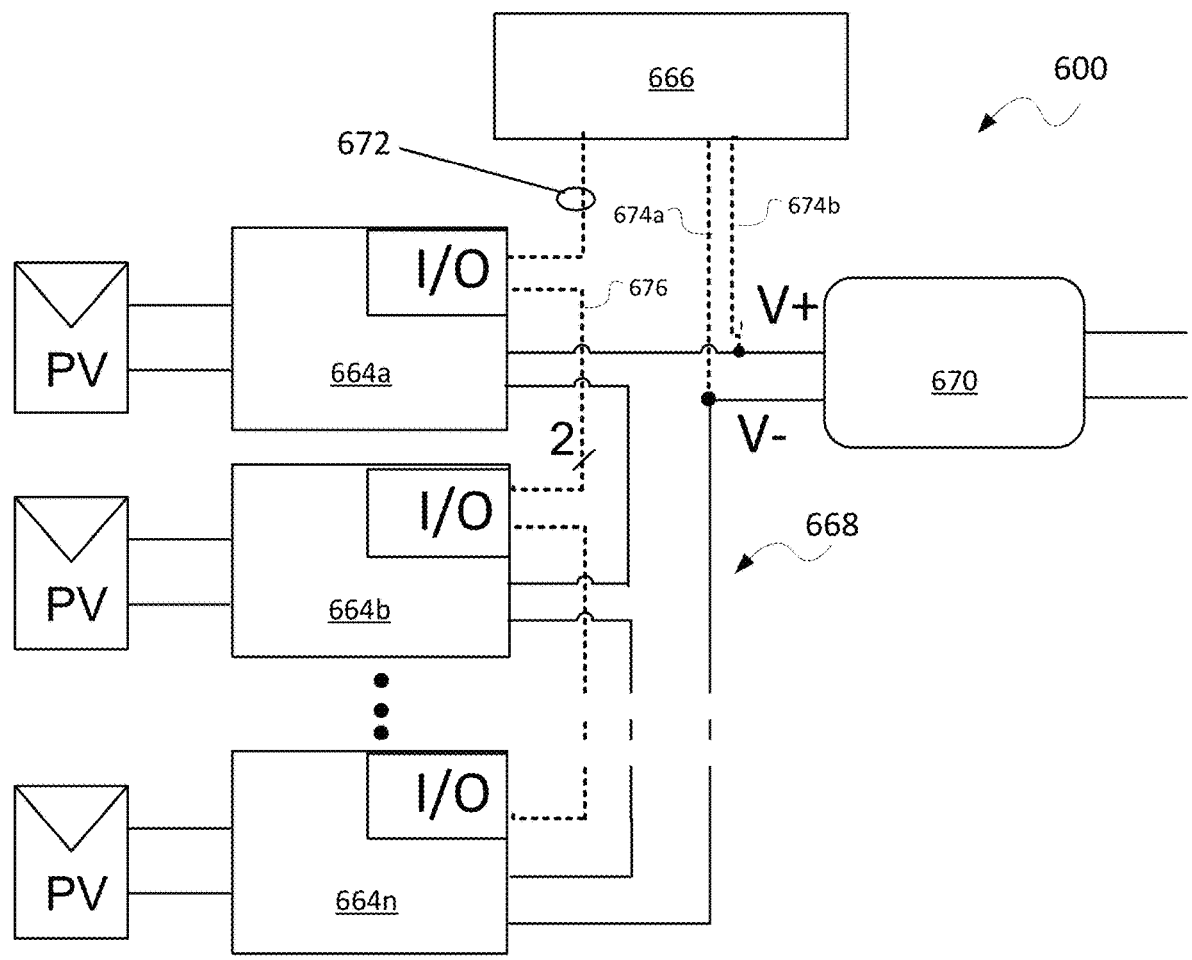
FIG. 6 illustrates an example of a photovoltaic system that provides a digital indicator of detected bus output voltage to each photovoltaic module.

FIG. 6 shows a system 600 in which an indicator of detected bus voltage is provided as a digital value to a plurality of photovoltaic module control circuits 664a-n. A resistor network and Analog-to-Digital Converter (ADC) 666 is provided in this example as a voltage detection circuit. Resistor network and ADC 666 is connected to an output of bus 668 where bus 668 connects to inverter 670. Individual leads 674a-b connect to negative and positive terminals respectively. Resistor network and ADC 666 generates a digital value as an indicator of detected bus voltage at the output of bus 668. A resistor network such as a voltage divider may reduce a detected voltage at the output of bus 668 to a smaller voltage for sampling by an ADC. The sampled voltage is used to generate an indicator of the detected voltage that may be multi-bit value. For example, the digital indicator of detected voltage may be in the form of one or more bytes of data per sample. The data may represent an absolute value (e.g. total voltage between terminals) or may represent a difference from a nominal voltage (e.g. difference between the detected voltage and a target voltage of, for example, 140 v). The indicator of detected voltage may be encoded as a digital value according to any suitable scheme using any appropriate sampling rate. In this example, an output from resistor network and ADC 666 is provided through a communication channel 672 that is a two-bit wide communication channel. In other examples, other communication channels may be used to provide feedback along one or more lines that connect to module output circuits. Such feedback lines may be combined in a bus or may be provided as separate feedback lines with one line extending to each module output circuit. In an embodiment, communication channel 672 is a serial peripheral interface (SPI) communication channel that uses a four-wire serial bus for communication. Each module output circuit 664*a-n* includes an input/output (I/O) circuit for digital communication. For example, module output circuit 664*a* has an I/O circuit that receives a digital input from communication channel 672 and provides a digital output to I/O circuit of module output circuit 664*b* through communication channel 676. The output provided through communication channel 676 may be the same digital value received through communication channel 672. In this way, an indicator of detected voltage may be passed along from one module output circuit to another. Additional information may also be sent in this way. For example, module output circuit 664*a* may receive an indicator of detected voltage and may modify its output accordingly. Module output circuit 664*a* may then send the indicator of detected voltage to module output circuit 664*b* along with information regarding any modifications made by module output circuit 664*a* to its output. In this way, each module output circuit may pass on not only an indicator of detected bus voltage but may also pass on some information about changes made to other outputs provided to the bus. In this way, module output circuits downstream (in the direction of data flow—down the page in FIG. 6) have information about bus voltage and about what other module output circuits have done in response to any changes in bus voltage. In other examples, an indicator of detected bus voltage may be directly sent to all module output circuits without additional information. For example, instead of passing an indicator of measured bus voltage from one module output circuit to the next, the indicator of measured bus voltage may be broadcast to all module output circuits in parallel.

Communication channels used for sending an indicator of detected bus voltage (with or without additional information), such as communication channels 672, 676, may be dedicated communication channels, such as dedicated wires, that are not used for other purposes, or may be shared with other data. While communications channels 672, 676 are shown separately in FIG. 6, these communications channels may be combined with other components in some cases. For example, communication may be provided through bus 668, or through other hardware that connects module output circuits so that dedicated hardware may not be required. In some cases, communication channels may be wireless communication channels with wireless I/O circuits provided in module output circuits to receive an indicator of detected bus voltage that is sent wirelessly by a voltage detection circuit.

Figure 7:
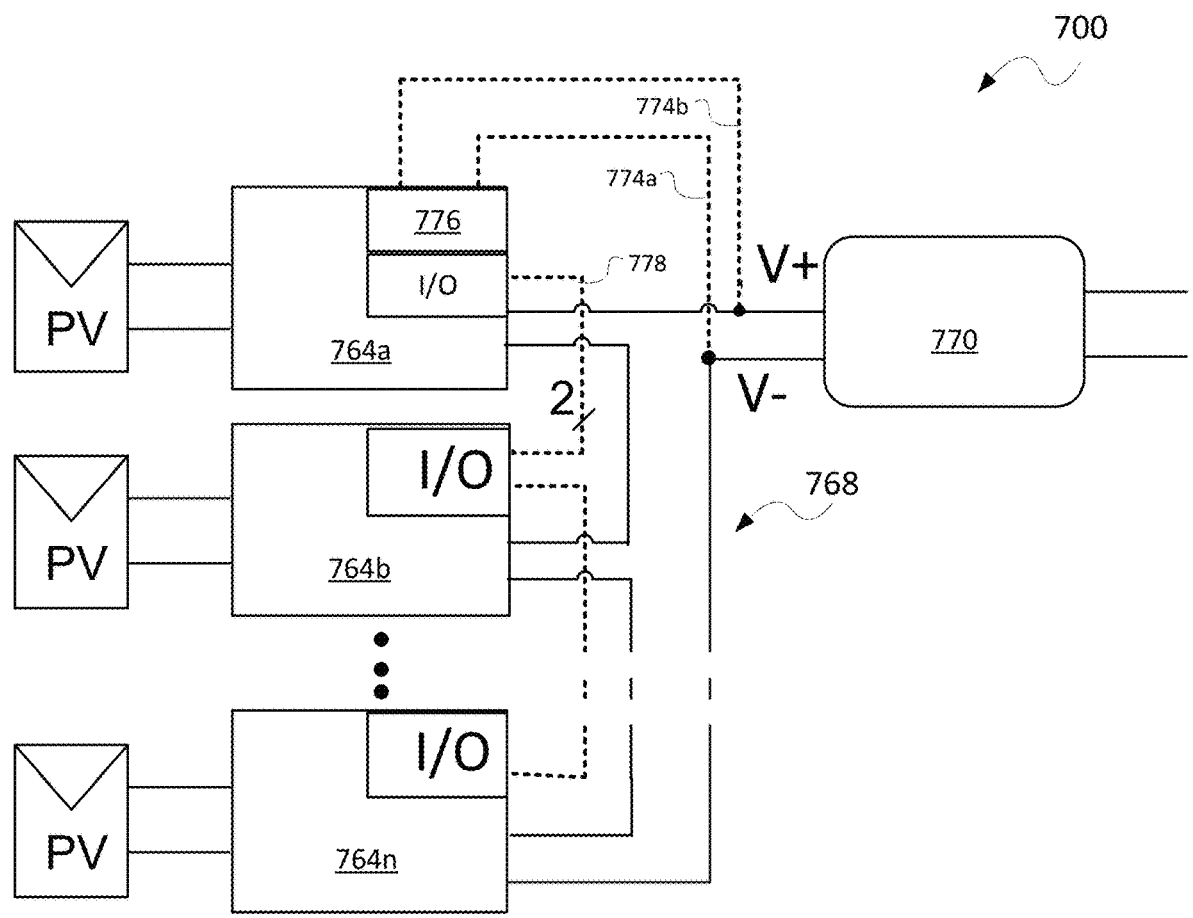
FIG. 7 illustrates an example of a photovoltaic system that includes a voltage detection circuit located in a photovoltaic module.

FIG. 7 illustrates one embodiment of a photovoltaic system 700 where a voltage detection circuit is located within a module output circuit that is connected to a bus 768 that is connected to an inverter 770. Instead of having a separate voltage detection circuit (e.g. resistor network and ADC 666 of FIG. 6), in this example, a voltage detection circuit is combined with a module output circuit and may be located in a common housing with the module output circuit, which may allow some sharing of resources thereby saving cost. For example, a voltage detection circuit may be physically implemented as a circuit board in a module output circuit, or as a chip, programmable logic device (PLD) or other hardware. In another example, a voltage detection may be implemented through firmware or software in a module output circuit, or may be implemented by a combination of hardware and software.

Module output circuit 764*a* includes a voltage detection circuit 776 that is connected to the output of bus 768 where it connects to input terminals of inverter 770. Lead 774*a* connects to a negative output (V−) of bus 768 while lead 774*b* connects to positive output (V+) of bus 768 and leads 774*a-b* connect directly to voltage detection circuit 776, which detects the voltage across the output of bus 768 (i.e. detects the voltage difference between the positive and negative outputs of bus 768, which is the voltage provided to input terminals of inverter 770). Voltage detection circuit 776 may include a resistor network and ADC to provide an indicator of detected voltage as a digital output. This digital output may be used by a controller in module output circuit 764*a* to control the output of module output circuit 764*a*. The indicator of detected voltage is also sent from module output circuit 764*a*, via its I/O circuit and communication channel 778, to module output circuit 764*b*, which uses the indicator of detected voltage to control its output. Module output circuit 764*b* also passes the indicator of detected voltage to the next module output circuit, and so on from module output circuit to module output circuit of all photovoltaic modules connected to bus 768. Module output circuit 764*n* is shown as the last module output circuit attached to bus 768 so it does not provide the indicator of detected voltage to any subsequent module output circuits.

Figure 8:
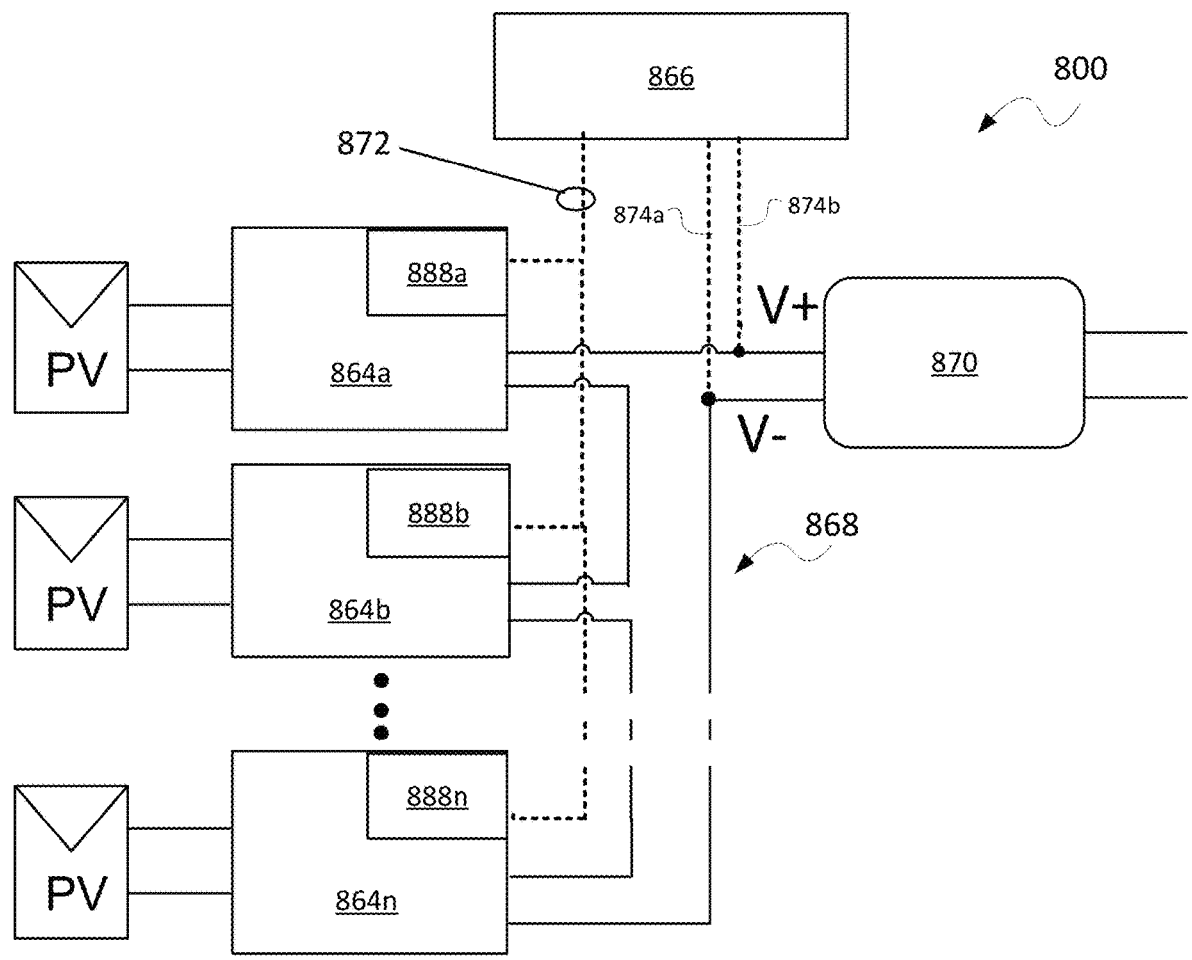
FIG. 8 illustrates an example of a photovoltaic system that provides an analog indicator of detected bus output voltage to each photovoltaic module.

FIG. 8 shows an embodiment in which each module output circuit 864*a-n* connected to a bus 868 includes an analog-to-digital converter (ADC) 888*a-n*. In this example, bus 868 provides an output to inverter 870. Leads 874*a-b* are attached to the output of bus 868. Leads 874*a-b* connect to a resistor network 866 that provides an analog output on communication channel 872 that is an indicator of detected voltage at the output of bus 868. Resistor network 866 may be a simple circuit such as a voltage divider that is formed using resistors or other passive components. Communication channel 872 may be any suitable analog communication channel for conveying an analog signal including, for example, a wireless channel, or a wired channel formed by one or more conductive wires. Communication channel 872 connects to module output circuits 864*a-n* to provide an indicator of detected bus voltage to each module output circuit connected to bus 868. Each module output circuit 864*a-n* includes an ADC 888*a-n* which is connected to communication channel 872. ADCs 888*a-n* each receive an analog indicator of detected voltage through communication channel 872 and convert this analog indicator to a digital value. Controllers in module output circuits 864*a-n* then use this digital indicator of detected voltage to control the output of respective module output circuits. This control is independently performed in each module output circuit based on the indicator of detected voltage. Thus, module output circuit 864*a* controls its output to bus 868 based on digital conversion of the indicator of detected voltage by ADC 888*a*, while module output circuit 864*b* controls its output to bus 868 based on digital conversion of the indicator of detected voltage by ADC 888*b*, and so on. It will be understood that an analog signal may be rapidly generated and broadcast to all module output circuits to allow rapid responses by module output circuits in this example.

Figure 9:
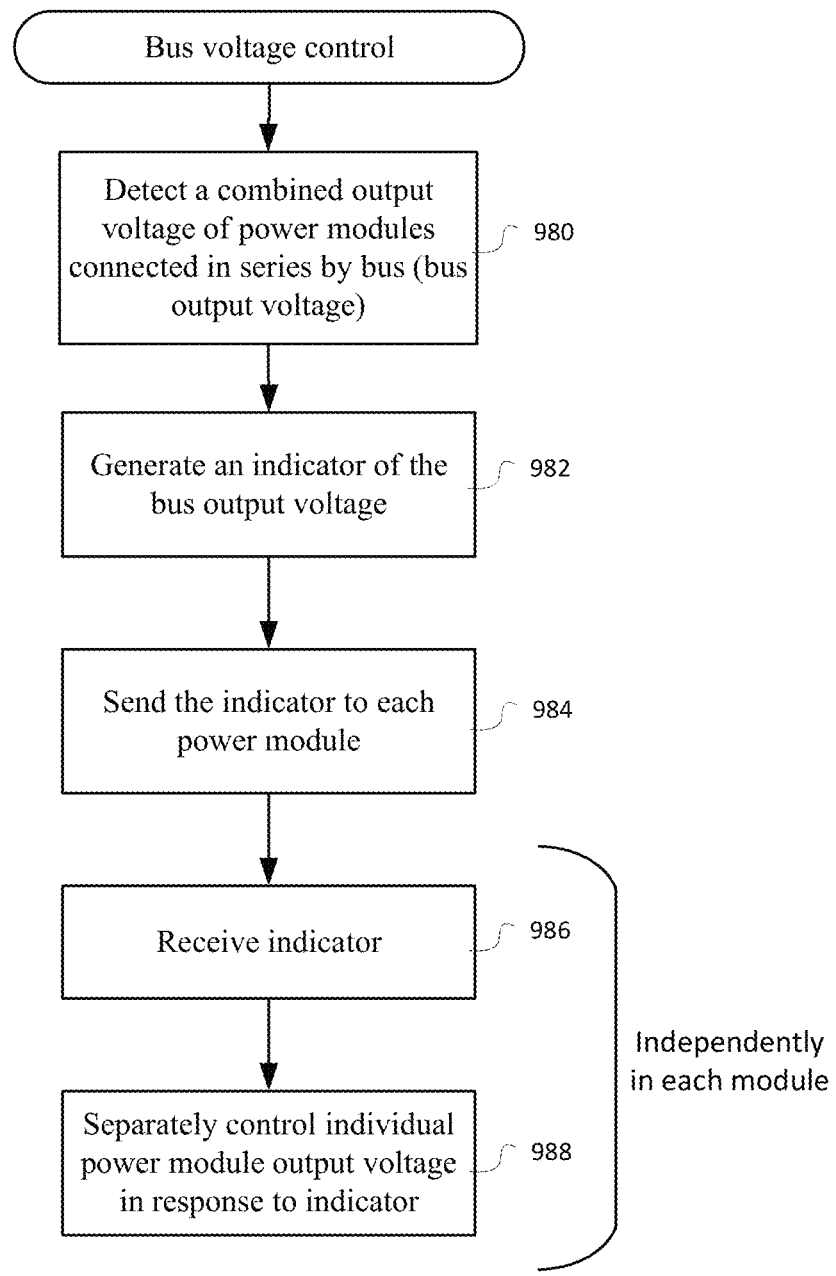
FIG. 9 is a flowchart illustrating control of bus voltage for a bus that connects multiple power modules.

FIG. 9 illustrates operation of an embodiment which uses bus output voltage in each module output circuit to separately control module output voltages of modules connected to the bus. The scheme illustrated in FIG. 9 may be implemented using various hardware including hardware examples described in the present figures. The combined output voltage of the power modules connected in series by the bus (the bus output voltage) is detected 980. For example, the bus output voltage may be detected at or near where the bus output connects to input terminals of an inverter by an appropriate detection module. Leads may be attached to conductors at a suitable location and connected to suitable detection hardware which may include a resistor network. An indicator of the detected voltage is then generated 982. The indicator of detected voltage may be, for example, an analog signal from a resistor network, or a digital indicator generated by an ADC, where a resistor network or ADC may be considered indicator generator modules. The indicator of detected voltage is then sent to each power module 984 through a communication channel. For example, the indicator of detected voltage may be sent to controllers that are provided in module output circuits of each power module. Indicators of detected voltage may be sent through dedicated communication channels or may be sent through communication channels that are used for other data. Communication channels may be wired or wireless. Indicators of detected voltage may be sent in parallel to all power modules, or may be sent from power module to power module, or in any suitable manner. Indicators of detected voltage are then received 986 in module output circuits of each power module, which may be considered as indicator receiving modules. Individual power module output voltages are separately controlled 988 in response to the indicators of detected voltage received by the power modules. Outputs may be controlled by controllers in module output circuits.

Figure 10:
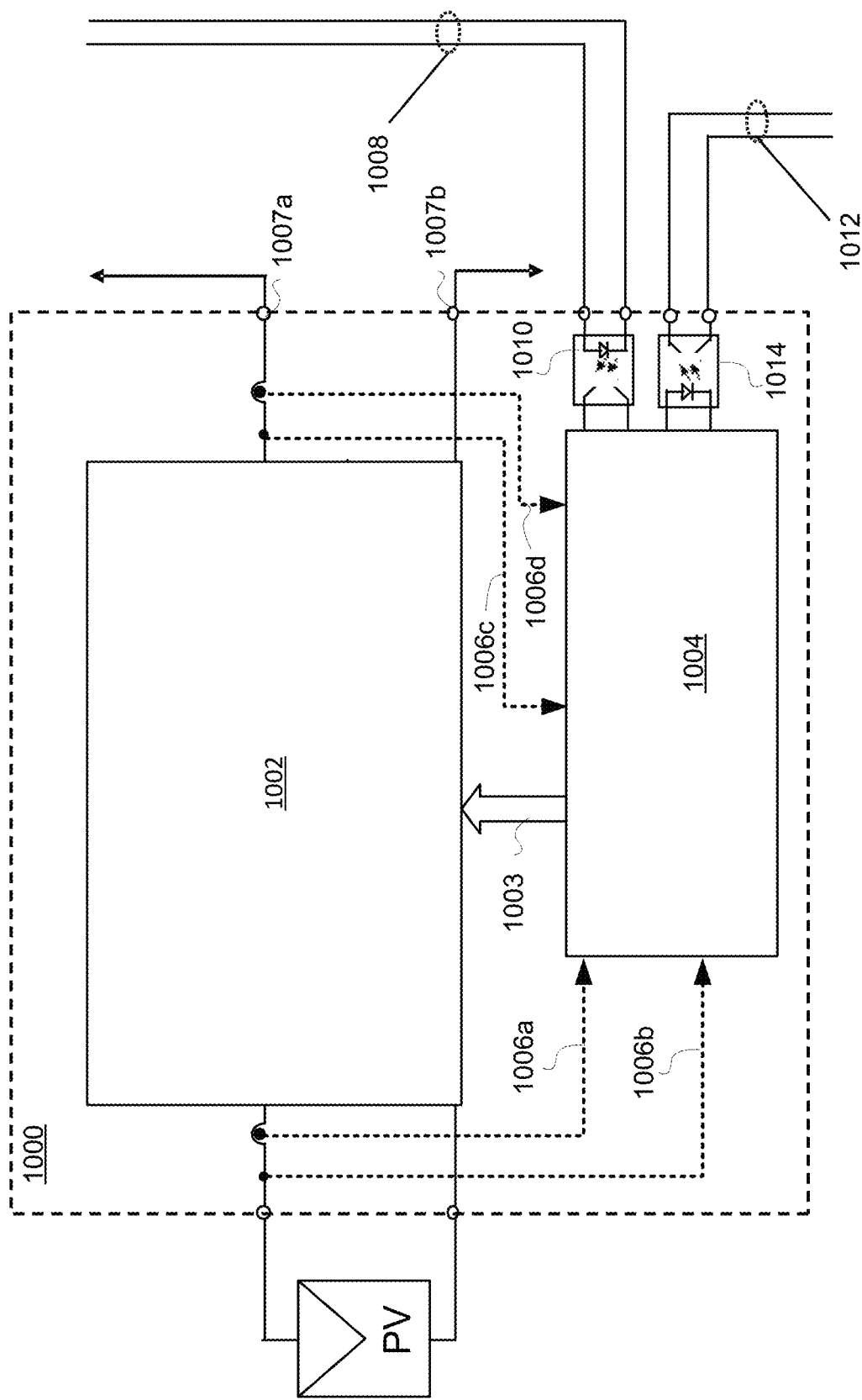
FIG. 10 illustrates an example of a module output circuit that includes a boost-buck circuit.

FIG. 10 illustrates an example of a module output circuit 1000 that includes a boost-buck circuit 1002 and a controller 1004 that controls boost-buck circuit 1002. Specifically, controller 1004 provides an output that controls a duty cycle of boost-buck circuit 1002. A boost-buck circuit is an example of a switched-mode power circuit. The details of operation of a boost-buck circuit are well-known in the art. In short, transistors in a boost-buck circuit act as switches that allow a capacitor to be alternately charged from an input that includes an inductor in a first phase, and discharged to an output in a second phase. The relative amounts of time spent charging in the first phase and discharging in the second phase may be controlled, for example, by the width of a pulse used to select between phases. Thus, boost-buck circuit 1002 may be controlled by a signal (gating signal) from a controller, such as a pulsed signal 1003 with pulse width modulation (PWM) to control duty cycle and thereby control the output of boost-buck circuit 1002.

Controller 1004 is connected to input and output terminals of boost-buck circuit 1002 so that controller 1004 is provided with data regarding conditions at the input and output terminals. Specifically, four different sensed parameters are provided to controller 1004: on the input side, where module output circuit 1000 receives an electrical input from a photovoltaic panel (PV), a first input 1006a indicates input current (current provided to module output circuit 1000 by the photovoltaic panel) and a second input 1006b indicates input voltage (voltage across input terminals that is provided to module output circuit 1000 by the photovoltaic panel). On the output side, where module output circuit 1000 provides an output to a bus, a third input 1006c indicates output current (current flowing from module output circuit 1000 to bus) and a fourth input 1006d indicates output voltage (voltage across output terminals 1007a, 1007b that is provided to the bus).

In addition to the inputs indicating conditions at input and output terminals of module output circuit 1000, module output circuit 1000 also receives an external input from outside module output circuit 1000 via communication channel 1008. Communication channel 1008 is a wired communication channel with two conductors in this example. In other examples, a communication channel may optical (e.g. fiber optic), wireless, or other suitable channel. Communication channel 1008 provides additional input to controller 1004, for controller 1004 to use when controlling duty cycle of boost-buck circuit 1002. For example, communication channel 1008 may provide an indicator of bus output voltage that is detected at an output of the bus. Thus, in addition to having local information from inputs 1006a-d, controller 1004 is provided with external information including the total voltage provided by all modules attached to the bus (e.g. voltage at input terminals of an inverter). Communication channel 1008 is connected to an optocoupler 1010. Optocoupler 1010 is a component that provides electrical isolation between communication channel 1008 and controller 1004. For example, an electrical input may be converted into light (e.g. by an LED or other light source) which is then converted back into an electrical output (e.g. by a photodiode). Converting an input into light and back into an electrical signal may isolate controller 1004 from potentially damaging voltages that could be present on communication channel 1008. Optocoupler 1010 may be a digital optocoupler where communication channel 1008 is a digital communication channel (e.g. SPI channel) or may be a linear optocoupler where communication channel 1008 is a digital communication channel. Communication channel 1008 receives an input from the bus output where there may be high voltages (higher than present within any individual module). Thus, there is a risk that a high voltage could reach controller 1004 through communication channel 1008. Optocoupler 1010 provides an isolating component between communication channel 1008 and controller 1004 to ensure that a high voltage on communication channel 1008 is not passed to controller 1004.

Controller 1004 provides an output to communication channel 1012 through an optocoupler 1014. Communication channel 1012 extends to another module output circuit that is connected to the same bus (down bus in FIG. 10) and may convey information that the other module output circuit uses to regulate its output. For example, an indicator of detected bus output voltage that is received via communication channel 1008 may be sent out via communication channel 1012. In this way, module output circuit 1000 passes on information to a subsequent module, which may in-turn pass the information to a subsequent module output circuit, and so on down the bus. It will be understood that communication channel 1008 may be directly connected to a bus output, or may be connected to another module output circuit on the same bus (up bus in FIG. 10), which in turn may connect to another module output circuit up to a module output circuit that is directly connected to a bus output.

Each module output circuit connected to a bus may receive identical data that is relayed in a daisy-chain arrangement. Alternatively, there may be some differences in data received by different module output circuits. In some cases, a module output circuit may add some data when sending on data that it received. For example, in addition to bus output voltage or other data received by module output circuit 1000, duty cycle data, module output voltage and/or current, module input voltage and/or current, and/or other data may be sent to another module output circuit. In this way, a module output circuit that is downstream (down bus in FIG. 10) may receive information about module output circuits upstream, in addition to information about the overall bus output. Such communication is not limited to a single direction. Communication channels may be bi-directional so that data may be sent in either direction. Thus, while bus output data may be sent in a particular direction, other data may be send in the opposite direction along the same communication channels. Thus, controller 1004 may receive additional data over communication channel 1008 and or communication channel 1012, which it may use to control the output of module output circuit 1000. Module output circuits may establish communication via a handshake routine that establishes the number of modules attached to the bus and may establish characteristics of different modules so that each module output circuit may adjust its output based on overall system characteristics.

Figure 11:
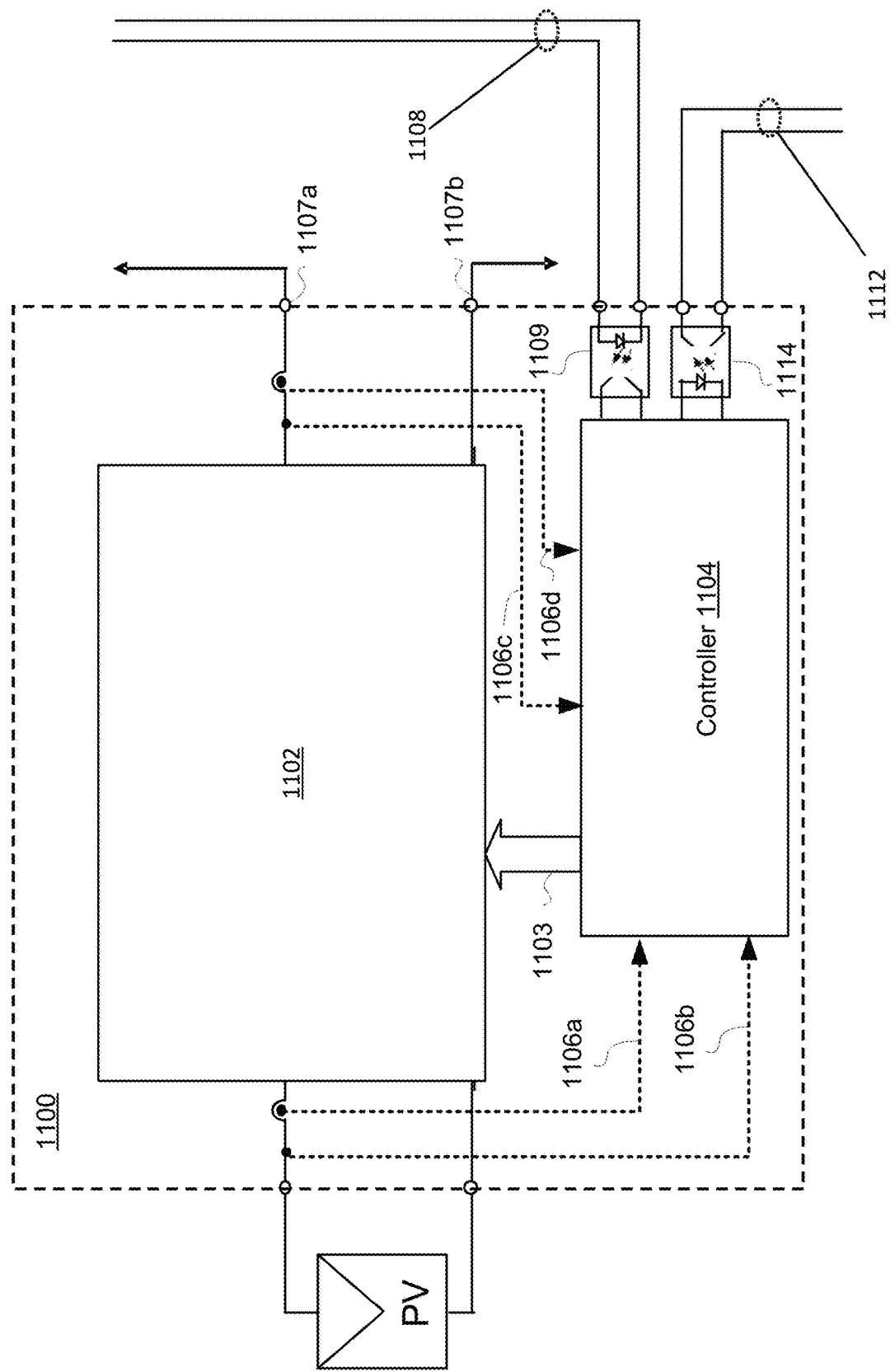
FIG. 11 illustrates an example of a module output circuit that includes a buck-boost circuit.

FIG. 11 illustrates an example of a module output circuit 1100 that includes a buck-boost circuit 1102 and a controller 1104 that controls buck-boost circuit 1102. Specifically, controller 1104 provides an output that controls a duty cycle of buck-boost circuit 1102. A buck-boost circuit is another example of a switched-mode power circuit that is similar to boost-buck circuit 1002 of FIG. 10 but with the inductor and capacitor locations changed. The details of operation of a buck-boost circuit are well-known in the art. In short, transistors in a buck-boost circuit act as switches that allow a capacitor to be alternately charged from an input that includes an inductor in a first phase, and discharged to an output in a second phase. The relative amounts of time spent charging in the first phase and discharging in the second phase may be controlled, for example, by the width of a pulse used to select between phases. Thus, buck-boost circuit 1102 may be controlled by a signal (gating signal) from controller 1104, such as a pulsed signal 1103 with pulse width modulation (PWM) to control duty cycle and thereby control the output of buck-boost circuit 1102.

Controller 1104 is connected to input and output terminals of buck-boost circuit 1102 so that controller 1104 is provided with data regarding conditions at the input and output terminals. Specifically, four different sensed parameters are provided to controller 1104: on the input side, where module output circuit 1100 receives an electrical input from a photovoltaic panel (PV), a first input 1106a indicates input current (current provided to module output circuit 1100 by the photovoltaic panel) and a second input 1106b indicates input voltage (voltage across input terminals that is provided to module output circuit 1100 by the photovoltaic panel). On the output side, where module output circuit 1100 provides an output to a bus, a third input 1106c indicates output current (current flowing from module output circuit 1100 to bus) and a fourth input 1106d indicates output voltage (voltage across output terminals 1107a, 1107b that is provided to the bus).

In addition to the inputs indicating conditions at input and output terminals of module output circuit 1100, module output circuit 1100 also receives an external input from outside module output circuit 1100 via communication channel 1008. Communication channel 1108 is a wired communication channel with two conductors in this example. In other examples, a communication channel may optical (e.g. fiber optic), wireless, or other suitable channel. Communication channel 1108 provides additional input to controller 1104, for controller 1104 to use when controlling duty cycle of buck-boost circuit 1102. For example, communication channel 1108 may provide an indicator of bus output voltage that is detected at an output of the bus. Thus, in addition to having local information from inputs 1106a-d, controller 1104 is provided with external information including the total voltage provided by all modules attached to the bus (e.g. voltage at input terminals of an inverter). Communication channels 1108 is connected to an optocoupler 1109 as previously described with respect to FIG. 10. Controller 1104 also provides an output to communication channel 1112 through an optocoupler 1114. Communication channels 1108 and 1112 may operate similarly to communication channels 1008 and 1012 discussed above with respect to FIG. 10.

Module output circuits 1000 and 1100 provide two examples of module output circuits that include switched-mode power circuits that are controlled by a controller that receives an indicator of detected voltage from a bus output along with other parameters. Other module output circuits may use different switched-mode power circuits, or may use other power circuits (e.g. linear power circuits). A controller in a module output circuit may use the parameters provided to control a power circuit in various ways. Some examples are described below.

Figure 12:
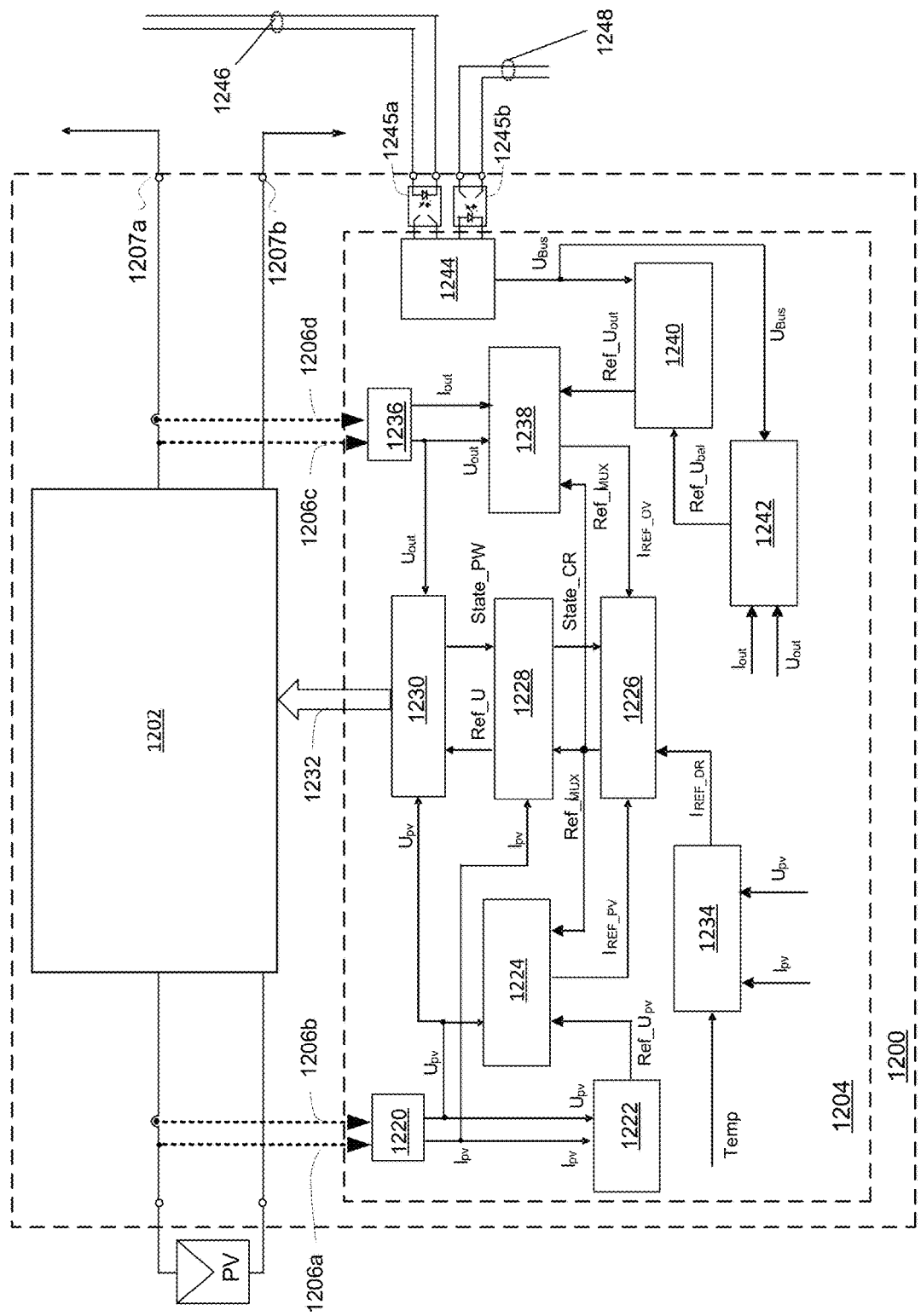
FIG. 12 illustrates an example of a module output circuit that includes a controller receiving an indicator of detected bus output voltage.

FIG. 12 shows a schematic diagram of a module output circuit 1200 that includes a boost-buck circuit 1202 and a controller 1204, which is shown in some detail. Controller 1204 includes a first analog-to-digital converter 1220 (A/D), which receives an indicator of input voltage 1206a and an indicator of input current 1206b from boost-buck circuit 1202 as previously described. Analog-to-digital converter 1220 generates digital values Ipv and Upv accordingly that represent input current and input voltage respectively from the photovoltaic panel (PV). Digital values Ipv and Upv are then sent to MPPT module 1222. A Maximum Power Point Tracking (MPPT) scheme may be implemented by MPPT module 1222 according to any suitable system to keep the photovoltaic panel operating efficiently. MPPT module 1222 provides an output, Ref_Upv, that indicates a reference voltage for the photovoltaic panel that may be higher or lower than a detected voltage indicated by Upv in order to increase efficiency. Input side regulator 1224 receives Ref_Upv and generates Iref_PV in response. Iref_PV is sent to a multiplexer, MUX 1226. MUX 1226 also receives other inputs and selects one of the inputs to generate an appropriate output, Ref_Imux to send to Current regulator 1228. Current regulator 1228 then generates a reference, Ref_U to Pulse Width Modulation (PWM) generator 1230, which provides a signal 1232 with a pulse width that controls the duty cycle of boost-buck circuit 1202.

Another input to MUX 1226 is provided by Derating circuit 1234, which receives inputs Ipv and Upv (e.g. from analog-to-digital converter 1220) and a temperature indicator ("Temp"), which may be generated by a temperature measuring device (e.g. thermocouple) in module output circuit 1200. Derating circuit 1234 generates output Iref_dr in response to the inputs it receives. In one example, derating circuit 1234 generates a default output when the temperature indicated as being below a threshold value and generates a different value when the temperature is indicated as being above a certain value. This may cause a reduction in power when temperature exceeds an acceptable value.

On the output side of boost-buck circuit 1202, output voltage and output current indicators are detected at output terminals 1207a, 1207b and indicators of output voltage and current, 1206c and 1206d respectively, are provided to an analog-to-digital converter 1236 in controller 1204. Digital values Uout and Iout representing output voltage and current respectively are sent to output side regulator 1238. Output side regulator 1238 also receives an input Ref_Uout from bus voltage management module 1240. Bus voltage management module 1240 receives two inputs, Ref Ubal and Ubus. Input Ref_Ubal is received from cell balancing module 1242, which generates Ref_Ubal in response to Iout and Uout (e.g. from analog-to-digital converter 1236) and Ubus from a programmable logic device, PLD 1244.

PLD 1244 is connected to communications channels 1246 and 1248 through optocouplers 1245a, 1245b as previously described so that PLD 1244 may receive information regarding bus output voltage (e.g. an indicator of detected voltage at a bus output). PLD 1244 may be any suitable device including a field programmable gate array (FPGA), or complex PLD (CPLD). In other examples, an application specific integrated circuit (ASIC) may be used instead of a PLD, or a general-purpose processor may be configured by firmware, or otherwise, to perform functions performed by PLD 1244 in FIG. 12. PLD 1244 is responsible for external communication, including receiving data from elsewhere in the bus, such as an indicator of detected voltage, current, information from other module output circuits, etc. PLD 1244 generates output Ubus in response, which may be a digital value indicating bus output voltage (PLD 1244 may perform analog-to-digital conversion if communication channels 1246 and/or 1248 are analog). Output Ubus is sent to cell balancing module 1242 and also to bus voltage management module 1240. In response to Ubus, bus voltage management module 1240 generates Ref_Uout to change the output of the module output circuit in response to certain conditions. For example, when Ubus received from PLD 1244 indicates that bus voltage is high, then bus voltage management module 1240 may generate a value of Ref_Uout to reduce output voltage of module output circuit 1200 accordingly. When Ubus received from PLD 1244 indicates that bus voltage is low, then bus voltage management module 1240 may generate Ref_Uout to increase output voltage of module output circuit 1200 accordingly. Bus voltage management module 1240 may react to transient conditions on the bus indicated by Ubus by selecting an appropriate Ref_Uout and sending it to output side regulator 1238. If Ubus is in an acceptable range the bus voltage management module 1240 may generate Ref_Uout based on Ref_Ubal instead.

In general, Cell balancing module 1242 generates Ref_Ubal to indicate an unbalanced condition on the bus. For example, in a bus with n modules, a module would be expected to provide 1/nth of the total bus voltage (e.g. Uout=Ubus/n). If cell balancing module 1242 detects that this is not the case then it may initiate a control routine such as a balancing routine, for example, a droop control routine. Droop control routines generally use small changes in voltages to share load among power modules such as photovoltaic modules. Cell balancing module 1242 may also implement low voltage ride through (LVRT), zero voltage ride through (ZVRT), high voltage ride through (HVRT), and/or other routines to ensure the photovoltaic system operates safely and efficiently. In general, when a transient event occurs that causes a change to bus voltage that is outside acceptable parameters, bus voltage management module 1240 may change its output, Ref_Uout to react to the transient event. For example, cell balancing module 1242 provides an output Rev_Ubal that may be indicated by a cell balancing or other routine and bus voltage management module 1240 may generate Ref_Uout based on Ref-Ubal under normal conditions (when there is no transient event). When Ubus indicates occurrence of a transient event, bus voltage management module 1240 may disregard Ref_Ubal and generate Ref_Uout to respond to the transient event. Thus, bus voltage management module 1240 acts to override regular output voltage management when a transient event occurs.

Output side regulator 1238 provides an input Iref_ov to MUX 1226 according to Ref_Uout. MUX 1226 then generates output Ref_mux based on one of the inputs it receives. For example, during a transient event indicated by Ubus from PLD 1244, Iref_ov may be set at a value that causes MUX 1226 to set Ref_mux to react to the transient event. At other times, MUX 1226 may select between the different inputs based on a prioritization scheme. In general, adjustment relating to MPPT, derating, and cell balancing may be performed over a longer time scale than adjustment made to respond to transient events. Such adjustment may be prioritized by comparing magnitudes of changes indicated, or some other comparison of inputs. For example, a small change indicated by derating circuit may receive a low priority, but if temperature continues to increase, an output voltage change indicated by Iref-dr will increase until, at some point, MUX 1226 responds by generating Ref_mux based on Iref_dr. It should be noted that MUX 1226 sends Ref_mux to input side regulator 1224 and output side regulator 1238 to provide feedback to these units so that they can provide input to MUX 1226 based on current conditions, i.e. provide input to adjust MUX 1226 output based on current output of MUX 1226. MUX 1226 also receives feedback State_CR from current regulator 1228, which in turn receives feedback State PW from PWM generator 1230 so that each unit is able to provide output to a subsequent unit based on the current condition of the subsequent unit.

Figure 13:
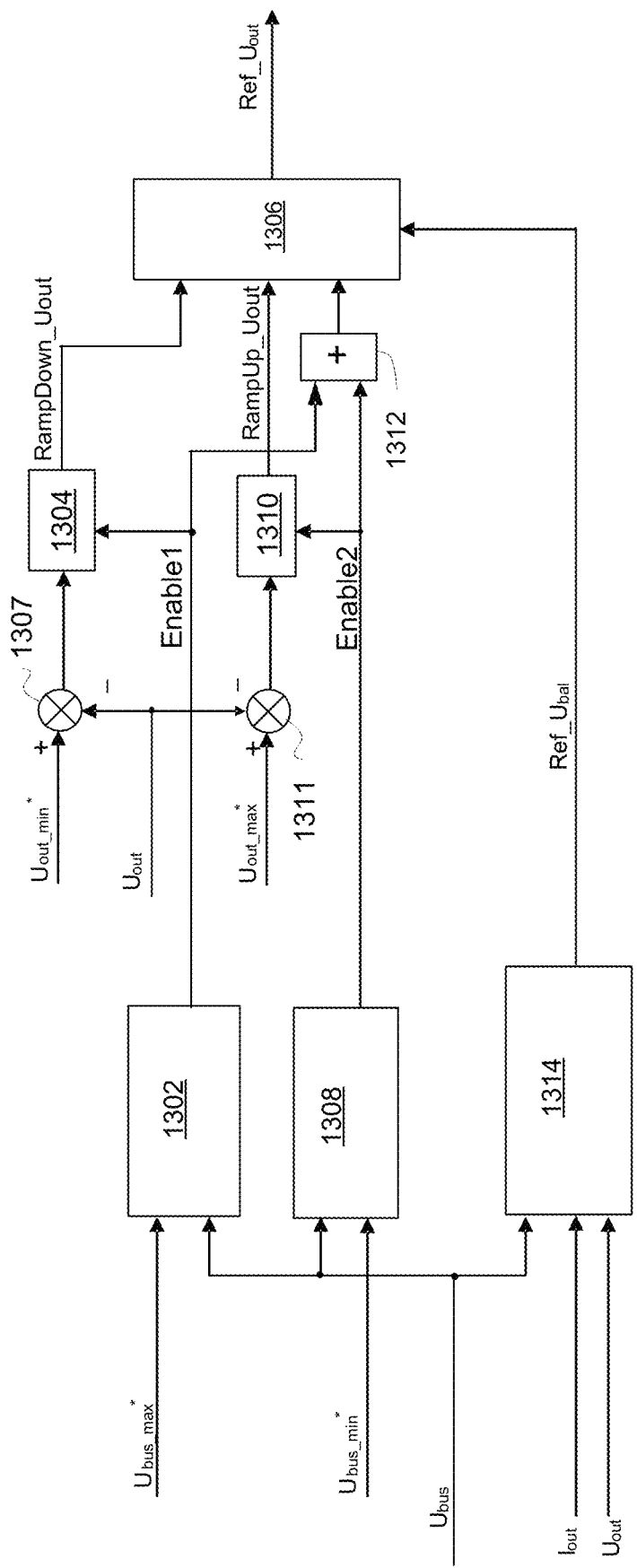
FIG. 13 illustrates schematically aspects of a controller in a module output circuit.

FIG. 13 is a schematic illustration of certain controller components in a module output circuit and shows how a controller may generate a control signal such as a PWM signal sent to a switched-mode power circuit, and particularly, how transient events may be handled. A voltage surge detection module 1302 receives an input Ubus that indicates the voltage at the output of the bus (this may be based on an indicator of detected voltage at the bus output) and compares it with a maximum value Ubus_max, which may be a preset parameter that is based on system requirements (e.g. regulatory requirements and/or specified limits for various components). When bus voltage exceeds a limit (e.g. Ubus>Ubus_max) voltage surge detection module 1302 sends a signal, Enable 1, to enable proportional integral controller, PI controller 1304 which then sends an output to switch 1306 that is based on a combination of present output voltage Uout of the module output circuit and the minimum output voltage indicated by Uout_min that is generated by combiner 1307. For example, PI controller 1304 may output a reference voltage to reduce output voltage from its present value, Uout, until it reaches a minimum set by Uout_min*. Thus, PI controller 1304 issues what may be considered a ramp-down output ("RampDown_Uout") when it receives Enable 1. When switch 1306 receives this as an input it adjusts its output, Ref_Uout accordingly, e.g. by passing RampDown_Uout as an output as Ref_Uout, thereby interrupting any other control signal in order to deal with a voltage surge. Switch 1306 may be implemented as a multiplexer that selects one of its inputs as an output. The switch output may be provided to a PWM generator for example.

A voltage dip detection module 1308 receives input Ubus and compares it with a minimum value Ubus_min, which may be a preset parameter that is based on system requirements (e.g. regulatory requirements and/or specified limits for various components). When bus voltage dips below a limit (e.g. Ubus<Ubus_min) then voltage dip detection module 1308 sends a signal, Enable 2, to enable PI controller 1310 which then sends an output to switch 1306 that is based on a combination of present output voltage Uout of the module output circuit and the maximum output voltage indicated by Uout_max* generated by combiner 1311. For example, PI controller 1310 may output a reference voltage to increase output voltage from its present value, Uout, until it reaches a maximum set by Uout_max*. Thus, PI controller 1310 issues what may be considered a ramp-up output ("RampUp_Uout") when it receives Enable 2. When switch 1306 receives this as an input it adjusts its output, Ref_Uout accordingly e.g. by passing RampUp_Uout as an output as Ref_Uout, thereby interrupting any other control signal in order to deal with a voltage dip. Thus, a transient event such as a voltage surge or voltage dip causes switch 1306 to change its output to either ramp output voltage up or down. Whenever RampDown_Uout or RampUp_Uout is received, it overrides any other input to switch 1306. Dealing with voltage surges may be prioritized over dealing with voltage dips by prioritizing RampDown_Uout over RampUp_Uout, though in practice, these inputs would not be expected to occur at the same time. Signals Enable1 and Enable2 are also provided to an adder 1312 that provides an input to switch 1306. Thus, when either a voltage surge or a voltage dip is detected, a signal is passed to switch 1306 so that it can react accordingly and select an input from PI controller 1304 or PI controller 1310 accordingly.

When there is neither a voltage surge nor a voltage dip at the output of the bus (when Ubus_min<detected voltage<Ubus_max) then neither PI controller 1304 nor PI controller 1310 is enabled and switch 1306 instead generates output Ref_Uout based on Ref_Ubal, which it receives from cell balancing and droop algorithm module 1314. Cell balancing and droop algorithm module 1314 generates Ref_Ubal based on detected bus output voltage indicated by Ubus_min and from module output current and voltage, Iout and Uout respectively.

Figure 14:
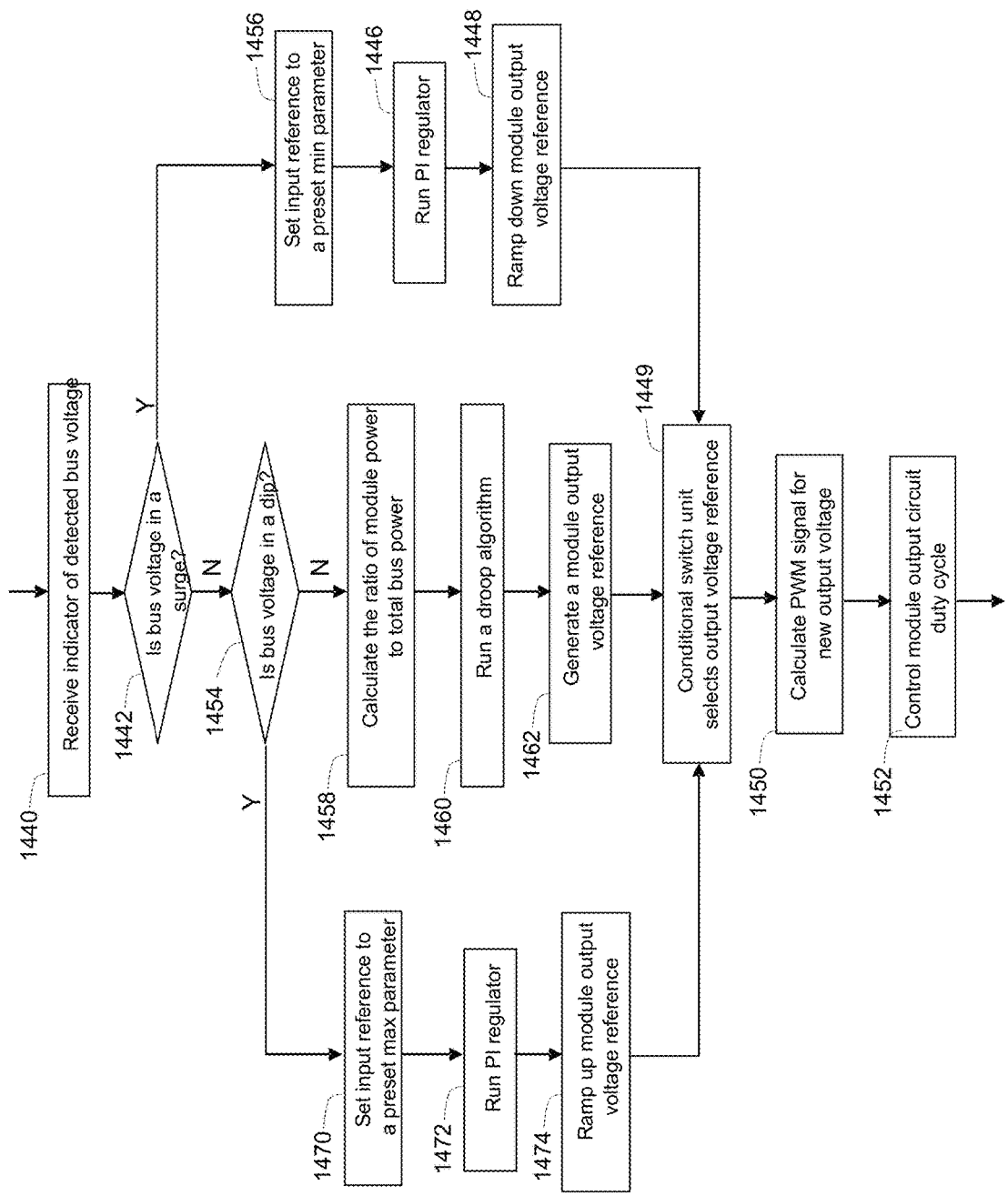
FIG. 14 is a flowchart illustrating aspects of operation of a controller in a module output circuit.

FIG. 14 is a flowchart that illustrates how a controller in a module output circuit may operate. An indicator of detected voltage at the output of the bus is received 1440. A determination 1442 is made as to whether the bus voltage is in a surge. If the bus voltage is in a surge then an input reference is set to a preset parameter 1456. A PI regulator is run 1446 using this input reference and a module output voltage reference is generated to ramp-down a module output voltage reference 1448. A conditional switch unit selects this input 1449 (because it is a high priority input associated with a transient event). A new PWM signal is calculated for the new output voltage 1450, based on the ramp-down module voltage reference received. This new PWM signal is then used to control module output duty cycle 1452.

If a voltage surge is not detected at determination 1442 then a further determination is made 1454 as to whether the bus voltage is in a dip (e.g. by comparing bus voltage with some minimum bus voltage). If the bus voltage is in a dip then an input reference is set to a preset parameter 1470 and a PI controller is run 1472 using this input reference. A module output voltage reference is generated to ramp-up module output voltage reference 1474 and this is provided to a conditional switch unit. The conditional switch unit selects this input 1449 (because it is a high priority input associated with a transient event). A new PWM signal is calculated for the new output voltage 1450, based on the ramp-up module voltage reference received. This new PWM signal is then used to control duty cycle 1452. Thus, a voltage dip is treated similarly to a surge by providing a predetermined reference to a PI regulator to thereby control a PWM signal, which then controls duty cycle.

If no voltage surge is detected at determination 1442 and no voltage dip is detected at step 1454 then the ratio of module power to total bus power is calculated 1458. A droop algorithm is run 1460 using a small step (e.g. increment or decrement output voltage). A module output voltage reference is generated 1462 accordingly and is sent to a switch. If there is no higher priority input to the switch (e.g. if there is no ramp-up or ramp-down input triggered by a transient event) this input is used to calculate a PWM signal for the new output voltage 1450, which is used to control module output circuit duty cycle 1452. Thus, when there is no surge or dip in bus voltage the droop algorithm controls duty cycle by making small modifications. In other examples, an MPPT control algorithm, or other algorithm may control duty cycle, or a combination of different algorithms can be used to collectively control duty cycle. When a dip or surge in bus voltage occurs then a different algorithm is used based on preset parameters applied through PI (proportional integral) control. While proportional-integral (PI) control is used in the example illustrated here, it will be understood that any suitable form of feedback control may be used.

The technology described herein can be implemented using hardware, software, or a combination of both hardware and software. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media is non-transitory and may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware including custom integrated circuits, gate arrays, FPGAs, PLDs, and special purpose computers. In one embodiment, software (stored on a storage device) implementing one or more embodiments is used to program one or more processors. The one or more processors can be in communication with one or more computer readable media/storage devices, peripherals and/or communication interfaces. In alternative embodiments, some or all of the software can be replaced by dedicated hardware including custom integrated circuits, gate arrays, FPGAs, PLDs, and special purpose computers.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of the present application be defined by the claims appended hereto.

What is claimed is:

1. An apparatus, comprising:
   a plurality of photovoltaic modules including at least a first photovoltaic module having a first power circuit controlled by a first duty cycle supplied to the first power circuit by a first controller to generate a first output and a second photovoltaic module having a second power circuit controlled by a second duty cycle supplied to the second power circuit by a second controller to generate a second output;
   a bus connecting the plurality of photovoltaic modules, the bus connecting the first output and the second output in series;
   a voltage detection circuit to measure a bus voltage at an output of the bus, to provide an indicator of measured bus voltage to the first controller, the indicator is a multi-bit digital value of one or more bytes per data sample from analog to digital conversion of the measured bus voltage by an analog-to-digital converter, the indicator providing information including the total voltage between output terminals of the bus;
   the first controller is configured to receive the indicator from the voltage detection circuit, change the first duty cycle for the first power circuit in response to changes in the total voltage between output terminals of the bus indicated by the indicator, and send the indicator to the second controller with additional data; and
   the second controller is configured to receive the indicator and the additional data from the first controller, change the second duty cycle of the second power circuit in response to changes in the total voltage between output terminals of the bus indicated by the indicator and the additional data from the first controller.

2. The apparatus of claim 1, wherein the additional data includes data regarding changes to the first output.

3. The apparatus of claim 2 wherein the additional data includes one or more of duty cycle data for the first photovoltaic module and module output voltage and/or current for the first photovoltaic module.

4. The apparatus of claim 1 wherein the first controller and the second controller independently respond to the indicator of measured bus voltage, combined responses of the plurality of photovoltaic modules drive the bus voltage at the output of the bus to maintain the bus voltage at the output of the bus within a bus voltage range of 200 volts to 500 volts, the apparatus further comprising an inverter connected to the output of the bus and wherein the bus voltage range is in an acceptable input range of the inverter.

5. The apparatus of claim 1 wherein:
   the first controller is configured to detect an unbalanced condition by comparing a voltage of the first output with the total voltage between the output terminals divided by a number of photovoltaic modules connected to the bus; and
   the second controller is configured to detect an unbalanced condition by comparing a voltage of the second output with the total voltage between the output terminals divided by the number of photovoltaic modules connected to the bus.

6. The apparatus of claim 1, further comprising a direct communication channel from the analog-to-digital converter to the first controller and a bi-directional communication channel from the first controller to the second controller configured for communication from the first controller to the second controller and communication from the second controller to the first controller.

7. The apparatus of claim 1 wherein the analog-to-digital converter is located within a housing that houses a controller of the first photovoltaic module.

8. The apparatus of claim 1 wherein the voltage detection circuit further comprises a voltage divider configured to reduce a bus voltage to a smaller voltage for sampling by the analog-to-digital converter.

9. The apparatus of claim 1 wherein the plurality of photovoltaic modules includes two or more additional photovoltaic modules, each individual additional photovoltaic module configured to receive the indicator and additional data from one or more upstream photovoltaic modules, change a respective duty cycle in response to changes in the total voltage between output terminals of the bus indicated by the indicator and additional data from the one or more upstream photovoltaic modules, and send the indicator to a downstream photovoltaic module with additional data from the individual additional photovoltaic module.

10. An apparatus, comprising:
   a plurality of power modules, each power module of the plurality of power modules having a plurality of power cells connected to a power circuit and a controller to control an output voltage by controlling duty cycle of the power circuit;
   a bus connecting the plurality of power modules, the bus connecting outputs of the plurality of power modules in series;
   an inverter receiving a direct current (DC) input from the bus and generating an alternating current (AC) output;
   a voltage detection circuit to measure the DC input from the bus and to generate an indicator of measured voltage, the indicator is a multi-bit digital value of one or more bytes per data sample from analog to digital conversion of the measured bus voltage, the indicator providing information including the total voltage between output terminals of the bus; and
   a plurality of communication channels including:
      a first communication channel extending from the voltage detection circuit to a first power module of the plurality of power modules to provide the indicator of the measured bus voltage to the first power module;

a second communication channel extending from the first power module to a second power module of the plurality of power modules to provide the indicator of the measured bus voltage and additional data from the first power module to the second power module;

additional communication channels extending between additional power modules of the plurality of power modules; and the plurality of communication channels providing the indicator and additional data for individual feedback control by the controllers of duty cycles of the power circuits of the plurality of power modules in response to the total voltage between output terminals of the bus and additional data from controllers of other power modules of the plurality of modules.

11. The apparatus of claim 10 wherein each controller is configured to control an output voltage of a corresponding module, independently of other controllers of other modules, in response to the total voltage between output terminals of the bus.

12. The apparatus of claim 11 wherein each controller is configured to control the output voltage of the corresponding module using Proportional Integral (PI) control in response to the total voltage between output terminals of the bus.

13. The apparatus of claim 10 wherein a power circuit of a power module of the plurality of power modules includes a DC-to-DC converter that has either a boost-buck circuit or a buck-boost circuit, and wherein an output of the power module is generated by the DC-to-DC converter, the duty cycle of the DC-to-DC converter controlled by a corresponding controller in response to the total voltage between output terminals of the bus.

14. The apparatus of claim 13 wherein the output of the power module is controlled by modifying a duty cycle of the DC-to-DC converter using a Pulse Width Modulation (PWM) signal generated by the corresponding controller.

15. The apparatus of claim 10 wherein the plurality of power modules are photovoltaic power modules, each power module of the plurality of power modules having a plurality of photovoltaic cells.

16. The apparatus of claim 10 wherein the plurality of power modules are electrochemical power storage modules, each power module of the plurality of power modules having a plurality of electrochemical cells.

17. A method of operating a plurality of power modules connected in series, comprising:

measuring a combined output voltage of the plurality of power modules, the combined output voltage corresponding to a sum of individual output voltages of the plurality of power modules;

generating an indicator that represents the combined output voltage of the plurality of modules, the indicator is a multi-bit digital value of one or more bytes per data sample from analog to digital conversion of the measured bus voltage, the indicator providing information including the total combined output voltage of the plurality of modules;

sending the indicator to a first power module of the plurality of power modules;

receiving the indicator in the first power module of the plurality of power modules;

sending the indicator from the first power module to a second power module of the plurality of power modules with additional data from the first power module;

receiving the indicator and the additional data from the first power module in the second power module; and separately controlling in the second power module output voltage of the second power module by controlling duty cycle of a power circuit of the second module in response to changes in the combined output voltage of the plurality of modules indicated by the indicator and the additional data from the first power module.

18. The method of claim 17 wherein the additional data includes information regarding control of the first power module in response to the indicator.

19. The method of claim 17 wherein the plurality of power modules includes one or more additional power modules, each power module of the plurality of power modules configured to send information about power module operation and the indicator to a downstream power module such that each downstream power module receives the indicator and receives information about operation of one or more upstream power modules.

20. The method of claim 17 wherein separately controlling output voltage of the second power module includes applying a Proportional Integral (PI) control routine in the second power module in response to changes in the combined output voltage of the plurality of modules and the additional data from the first power module.

21. The method of claim 17 further comprising, in response to detecting a drop in the combined output voltage represented by the indicator, separately increasing, in each power module of the plurality of power modules, a respective individual power module output voltage in response to the drop in the combined output voltage.

22. The method of claim 17 wherein separately controlling output voltage of the second power module includes changing a duty cycle of a boost-buck or buck-boost circuit in response to changes in the combined output voltage of the plurality of modules and the additional data from the first power module.

* * * * *